United States Patent
Hambrecht et al.

(10) Patent No.: US 6,629,082 B1
(45) Date of Patent: Sep. 30, 2003

(54) AUCTION SYSTEM AND METHOD FOR PRICING AND ALLOCATION DURING CAPITAL FORMATION

(75) Inventors: William R. Hambrecht, San Francisco, CA (US); Othar Hansson, Union City, CA (US); Jordan Hayes, Berkeley, CA (US); Alan Katz, Dallas, TX (US); Charles Ocheret, Scarsdale, NY (US); Matt Regan, Wayne, PA (US)

(73) Assignee: W.R. Hambrecht & Co., San Francisco, CA (US)

( * ) Notice: Subject to any disclaimer, the term of this patent is extended or adjusted under 35 U.S.C. 154(b) by 0 days.

(21) Appl. No.: 09/347,949

(22) Filed: Jul. 6, 1999

Related U.S. Application Data

(60) Provisional application No. 60/139,511, filed on Jun. 15, 1999.

(51) Int. Cl.[7] ............................................. G06F 17/60
(52) U.S. Cl. ............................. 705/37; 705/35; 705/36; 705/37
(58) Field of Search ............................. 705/37, 35, 36

(56) References Cited

U.S. PATENT DOCUMENTS

2001/0034692 A1 * 10/2001 McRedmond ................ 705/37

FOREIGN PATENT DOCUMENTS

WO  WO 00/51047 A2 * 8/2000 ........... G06F/17/60

OTHER PUBLICATIONS

U.S. Securities and Exchange Commission, Proposed Rule: Determining the Term "Qualified Purchaser" under the Securities Act of 1933.*

John M. Dalton, Editor, How the Stock Market Works, 1993, NYIF Corp., Second Edition, pp. 33–60.*

John Downes and John Elliot Goodman, Dictionary of Finance and Investment Terms, 1998, Fifth Edition, pp. 132, 243, 600, 275.*

Lee Epstein, Newcomers Guide to the Dutch Auction Process (Securities Auctions), Corporate Cashflow Magazine, v11, n3, p42(2), Mar. 1990.*

PopNet Float Shows up the Flaws, Financial News, Feb. 7, 2000.*

* cited by examiner

*Primary Examiner*—Vincent Millin
*Assistant Examiner*—Charles R. Kyle
(74) *Attorney, Agent, or Firm*—Fish & Richardson P.C.

(57) ABSTRACT

Techniques are provided for an auction system that is used for pricing and allocating equity securities. Information about an offering to accept bids for equity shares is provided to qualified potential purchasers and non-qualified potential purchasers. Bids front potential purchasers for equity shares are received through a communication network. Bids are accepted and offered to be accepted only from qualified potential purchasers. A non-qualified potential purchaser submits a bid through a qualified potential purchaser. A clearing price for the offered shares is determined based on the received bids. Prospective investors who bid a price above the clearing price are allocated all of the shares for which they bid. Prospective investors who bid a price equal to the clearing price are allocated a pro-rata allocation of the shares for which they bid. No shares are allocated to prospective investors who bid a price below the clearing price.

44 Claims, 18 Drawing Sheets

Underwriter Customer Service Activities:
➤ Receive Account Opening Requests
➤ Assign Account Numbers to Approved Customers
➤ Notify OpenIPO Admin., of Account Number, UserID, and PIN
➤ Receive Confirmation of UserID and PIN
➤ Contact Institution with UserID and Temp PIN

AUCTION SYSTEM AND METHOD FOR PRICING AND ALLOCATION DURING CAPITAL FORMATION

CROSS REFERENCE TO RELATED APPLICATIONS

This application claims priority to provisional application No. 60/139,511 filed on Jun. 15, 1999, entitled "Auction System and Method for Pricing and Allocation During Capital Formation", by inventor William R. Hambrecht, resident of San Francisco, Calif., and to provisional application No. 60/140,293, filed on Jun. 18, 1999, entitled "Auction System and Method for Pricing and Allocation During Capital Formation", by inventor William R. Hambrecht, resident of San Francisco, Calif.

SUMMARY OF THE INVENTION

In one aspect, the invention provides an auction system and method used in concert with an underwriting process. By re-thinking accepted underwriting practices, the new system and process levels the playing field for pricing and allocating equity securities. Unlike the traditional method of allowing entities such as investment bankers to negotiate the offering price, an auction system and process in accordance with the invention, employs a mathematical model that lets the market set a share price that is optimal for both the company and the purchasers of shares of stock in the company. The result is a price that eliminates traditional fixed discounts and better reflects what the market is truly willing to pay for the stock.

One embodiment of the invention provides a system and method for determining the final offering price and allocations of stock in a company. First, an underwriter sets an initial price range for the shares. Then, any investor (whether institutional or retail) who is interested in the offering can place a bid in the auction through an internet website. Once the auction is closed, the auction system calculates a fair market clearing priced based loosely on a mathematical model created by Nobel Prize-winning economist William Vickrey. In effect, a software-driven auction engine ranks bids from highest price to lowest price. Starting with the highest priced bid, the amount of shares requested accumulate. At the price where the cumulative amount of requested shares is equal to the amount of shares the company wishes to sell, the clearing price is set. Everyone who bids above the clearing price receives a full allocation. Those who bid at the clearing price receive a partial allocation, while those who bid below the clearing price receive no shares. The result: shares are allocated in a more evenhanded way at a price determined not by negotiation behind closed doors but by institutional and retail investors bidding on equal footing based on the actual per share price they are willing to pay.

OVERVIEW

Figure 1:
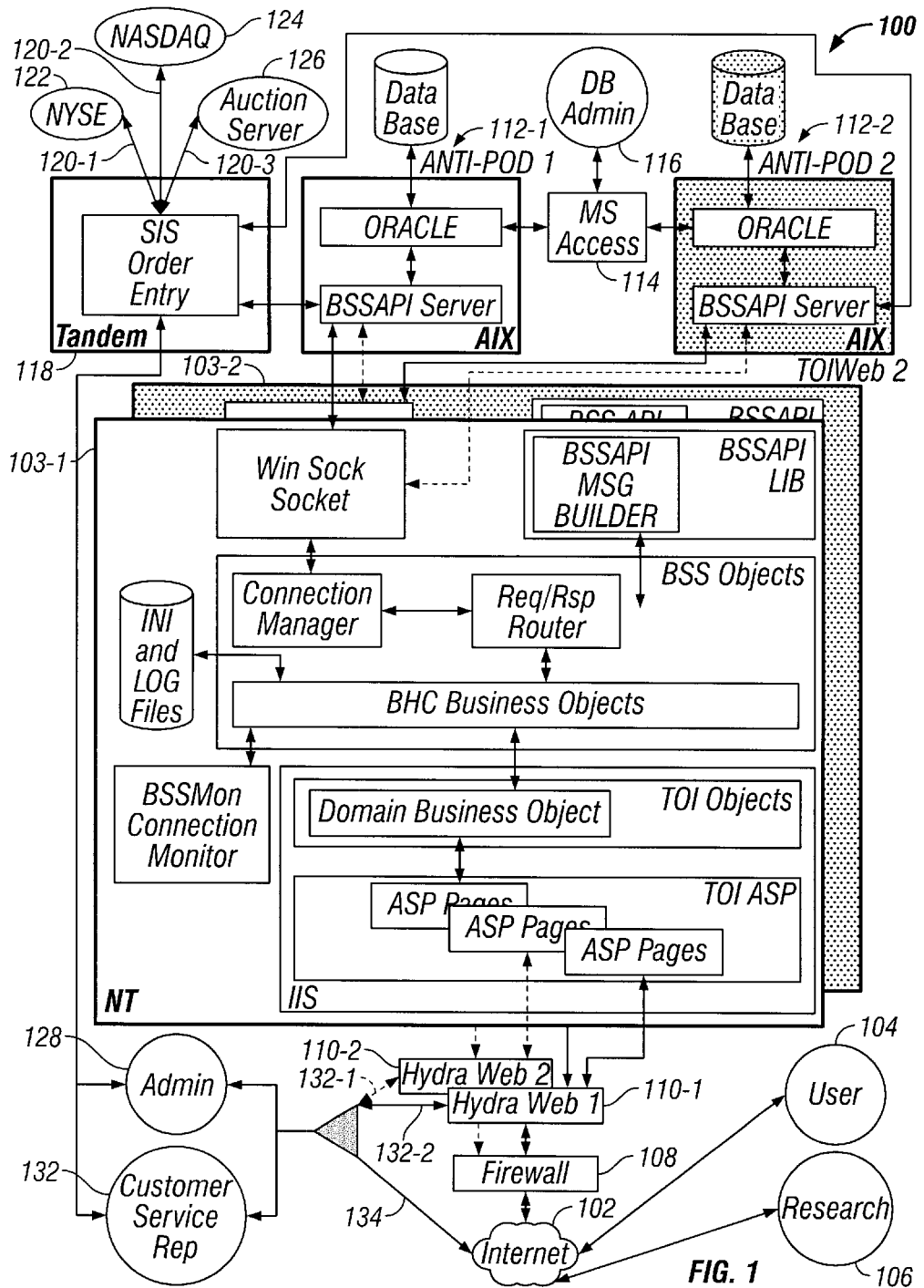
FIG. 1 is an illustrative system level diagram of a transaction server in accordance with a presently preferred embodiment of the invention.

An Auction Pricing Mechanism in accordance with the invention is a method of price determination for capital formation that can result in substantial benefits for companies seeking to raise capital through the sale of equity into the public market. An equity offering employing an auction in accordance with a present embodiment of the invention differs substantially from traditional underwritten public offerings in which underwriters employ a "book building" sales technique. In a "book building" process, the price at which shares are sold is determined by negotiation. A lead underwriter represents an offering company to investors and the investors to the offering company in the negotiation. In offerings conducted by auction in accordance with the invention, equity will generally be sold directly to the public by an offering company at a price determined by investors bidding for shares. Bids may be subject to a minimum price or range set by the offering company. An may serve as the Auction Advisor, and may provide a system upon which the auction is run and assists the offering company in marketing the offering and running the auction. Offerings conducted by such auction process may be run on the basis of a specific number of shares to be sold or amount of capital to be raised.

An equity offering auction in accordance with the invention provides a number of significant advantages over a traditional underwritten offering. Foremost, such auction provides a logical and precise method of determining valuation based upon market demand rather than the "book building" process. In the traditional "book building" process, companies are encouraged to "leave something on the table" in order to fill the underwriter's order book. In an auction in accordance with the invention, the offering can be more readily priced at the maximum valuation that the market can bear. In addition, due to the manner in which shares in such auction are allocated (see below), shares may be placed with those seeking long-term investment rather than the ability to "flip" the stock. This differs significantly from the traditional underwritten offering where shares are often placed with the underwriter's best customers who expect to have the ability to quickly sell those shares for a profit due to the discount on valuation that is typically built into the initial public offering price. In an auction in accordance with the invention, this discount can be readily eliminated and therefore, investors have no short-term incentive to sell their holdings. The auction system also can provide greater exposure to the retail market as individual investors have the ability to bid on offerings. This may have the effect of increasing demand over that of typical underwritten offering where the retail market is largely ignored relative to institutional buyers. Finally, due to the relatively low cost structure of the Underwriter, and the automation of the offering process, companies utilizing the auction process should be able to realize significant savings over the underwriting discounts charged in typical offerings as well as avoid unnecessary dilution by utilizing the auction to raise smaller amounts of capital than typically required by underwriters in traditional offerings.

How The Auction Mechanism Works

Offerings utilizing an auction in accordance with the invention will be conducted through the use of a software system developed. This system will handle multiple aspects of the offering process, including subscription, pricing and allocation.

Subscription

Equity offering transactions conducted by auction will be available to both institutional and retail investors. In order to participate in any given offering investors must be registered with a designated Underwriter. It is expected that institutional investors will be able to register directly with such Underwriter, but that retail investors will typically participate via on-line brokerage firms. On the day the shares become available for sale by the offering company registered investors can submit bids on the offering electronically through a web-based interface maintained by the Underwriter, as the Auction Advisor. Any investor making a bid will indicate the number of shares such investor would be willing to purchase ("Bid Quantity") and the price per share such investor would be willing to pay ("Bid Price"). No bid will be considered valid until immediately available funds in an amount equal to the total dollar value of such investor's bid are deposited into an escrow account established in connection with the offering. On the last day which the shares are available for sale by the offering company to investors, the offering company will stop accepting bids after the close of trading on the New York Stock Exchange (the "Auction Close").

Pricing

The price at which the offered stock is sold to investors will be determined following the Auction Close. All valid bids received by the offering company will be arranged by price in descending order. An accounting firm unaffiliated with the offering company (the "Auction Auditor") will, starting from the bid with the highest price and working downward, sum up the bid quantities (the "Rolling Accumulation"). At the bid price at which Rolling Accumulation surpasses the quantity of securities being offered (the "Aggregate Securities"), the Auction Auditor will establish such price as the price at which all investors whose bids are included in the Rolling Accumulation will be allocated shares (the "Clearing Price").

It will be appreciated that the pricing may be conducted by a computer software algorithm that has access to (prospective) investor bids.

Allocation

All investors whose bids are included in the Rolling Accumulation will be allocated shares. An investor whose bid price is above the Clearing Price will be allocated such investor's entire Bid Quantity (a "Full Allocation").

Full Allocation=Bid Quantity

An investor whose bid price equals the Clearing Price will be allocated a fraction of its Bid Quantity (a "Pro Rata Allocation"). The Pro Rata Allocation will be the product of such investor's Bid Quantity and the Aggregate Securities less the sum of the Bid Quantities above the Clearing Price divided by the sum of the Bid Quantities at the Clearing Price, as represented by the formula below:

$$\text{Pro Rata Allocation} = \frac{\text{Bid Quantity} \times (\text{Aggregate Securities} - \text{Sum of Bid Quantities above Clearing Price})}{\text{Sum of Bid Quantities at the Clearing Price}}$$

Any Pro Rata Allocation that results in the allocation of a fraction of a share will be rounded down to the nearest whole number. The additional shares made available due to the rounding mechanism (the "Additional Shares") will be allocated to the investor at the Clearing Price whose bid contained the highest Bid Quantity.

Example of Allocation of 100 share offer at $16 a Share

| Bid Price | Quantity | Rolling Accumulation | Allocation |
|---|---|---|---|
| $20 | 10 | 10 | 10 |
| 19 | 10 | 0 | 10 |
| 18 | 20 | 40 | 20 |
| 17 | 30 | 70 | 30 |
| 16 | 40 | 110 | 30[1] |
| 15[2] | 50 | 150 | 100 |
| | 160 | | |

[1] Each investor at $16 a Share receives 75% of his Bid Quantity
[2] Investors at $15 a Share will receive no allocation Closing Shares will be delivered to investors whose bids are accepted in the auction process four days following the Auction Close (the "Closing Date"). In addition, on the Closing Date the proceeds from the offering will be released from escrow and the fee payable to the Auction Advisor will be paid.

The Auction Advisor

As Auction Advisor, the Underwriter will assist the offering company in structuring and marketing its offering as well as provide the system upon which the auction can be conducted. Structuring the offering includes activities such as preparing a red herring statement and a prospectus for example. As a fee for its services as Auction Advisor, the Underwriter will typically charge a fee equal to approximately 3–5% of the aggregate proceeds of the offering. The terms and conditions of the Underwriter's role as Auction Advisor generally will be set forth in a Placement Agency Agreement by and between the offering company and the Underwriter. The Placement Agency Agreement generally provides, among other things, for the offering company to make certain representations and warranties to the Underwriter as Auction Advisor and that the offering company will indemnify the Auction Advisor against certain liabilities, including liabilities under the Securities Act of 1933, as amended.

Example of Equity Auction Process

1. Underwriter signs a non-binding letter of intent with a prospective issuer of securities. The language of the letter of intent will be substantially the same as is customarily employed by other firm commitment underwriters in the industry.
2. The issuer will file a registration statement. The underwriting arrangements will be clearly described in the relevant sections of the registration statement, including without limitation the Plan of Distribution section of the prospectus therein, and such arrangements will be consistent with the information set forth in this letter.
3. After the registration statement is filed and electronic and printed preliminary prospectuses become available, the Underwriter may begin accepting indications of interest from investors.
4. Prior to effectiveness, Underwriter shall represent to the satisfaction of NASD Regulation ("NASD") that sufficient capital will be available to Underwriter to meet the minimum net capital requirements for an open contractual commitment under SEC Rule 15c31, and obtain a statement expressing "no objections" to the distribution arrangements. The prospective net capital charge will be based on the high end of the range set forth in the "Calculation of Registration Fee" table in the effective registration statement, plus 20% of the maximum aggregate offering price, and be offset as firm bids are accepted. Upon approval of an acceleration request under SEC Rule 461, the offering will become effective with a price range under SEC Rule 430A. At this time, Underwriter will post the Rule 430A prospectus on its website.
5. After effectiveness, provided Underwriter has demonstrated to NASD's satisfaction that it has sufficient net capital to meet the prospective net capital charge described in paragraph 4, Underwriter No. 1 will open the auction for offers to purchase. Such offers to purchase may be received until the close of the auction. All offers to purchase are revocable until the close of the auction.
6. After effectiveness, Underwriter will confirm whether pre-effective indications of interest received by Underwriter are firm bids, and will notify selected dealers participating in the auction that they may solicit firm bids and instruct them to confirm which pre-effective indications of interest received by them are firm bids. All such firm bids also are revocable until the close of the auction. Underwriter will advise pre-effective bidders in person, by email, telephone, voicemail, facsimile, mail and/or posting a notice on its website that the registration statement is effective and that the prospectus is available at the website, and request that the pre-effective bidders confirm that their pre-effective indications of interest are firm bids. In cases of verbal notice the advice may be that the prospectus will be posted on the website if it has not yet been posted. (Bidders may consent to electronic prospectus delivery by e-mail or posting on the website in their account agreements.) All pre-effective bidders who have not furnished an email address will be notified in person, by telephone, voicemail, facsimile or mail. Underwriter also may state in the message or in a subsequent message that if pre-effective bidders do not respond by a certain time, their bids will be deemed withdrawn. All indications of interest that are not confirmed prior to the close of the auction shall be deemed withdrawn. The time to confirm that indications of interest are firm bids may vary depending on the facts and circumstances of the particular offering.
7. The auction will close not earlier than on a publicly disclosed date for the close of the auction. Upon close of the auction Underwriter will determine the clearing price based on 100% of the offered shares, excluding any shares covered by an overallotment option.
8. Immediately after the close of the auction, the lead Underwriter and any other underwriters will enter into a standard firm commitment underwriting agreement with the issuer to purchase 100% of the underwritten shares at a negotiated price based on the clearing price but at a discount from the public offering price. Although the lead Underwriter expects that the public offering price generally will be the clearing price, the actual public offering price may be at or below the clearing price. Concurrently with execution of the underwriting agreement, the lead Underwriter will take the appropriate net capital charge under SEC Rule 15c31 for an open contractual commitment based on 100% of the shares underwritten by Underwriter No. 1 at the public offering price. [It will be appreciated that the Underwriter's net capital charge may be reduced by contractual commitments, if any, by selected dealers to purchase the shares from Underwriter. In such cases, Underwriter will notify such dealers that they must take the appropriate net capital charge for the securities for which they have so committed.]
9. After the Underwriter signs the underwriting agreement with the issuer, Underwriter will communicate its acceptance at the public offering price of firm bids placed at or above the clearing price for the number of shares bid except that bids at the clearing price may be prorated based on the number bid at that price. In addition, as will be described in the prospectuses for IPO offerings, Underwriter has the right to accept certain large bids in part and limit the allocation of securities with respect to such large bids if Underwriter believes such partial allocation is necessary to facilitate a reasonable public distribution of the shares available in the offering. Underwriter also reserved the right to reject bids that it deems manipulative, disruptive or which it deems necessary or beneficial to facilitate the orderly completion of the offering, and the right, in exceptional circumstances, to alter the method of allocation a sit deems necessary to effect a fair and orderly distribution of the offered shares. Communication of acceptance will be in the manner set forth in paragraph 6. Underwriter will post the Rule 424(b) prospectus on its website in place of the Rule 430A prospectus as soon as practicable after setting the public offering price. Underwriter's clearing firm will send confirmations to bidders whose offers to purchase are accepted. All electronic delivery methods will be in conformance with SEC interpretations of use of electronic media for delivery, particularly as stated by the SEC in Release Nos. 337233 (Oct. 6, 1995) and 337288 (May 9, 1996). Underwriter will deliver hard copy of the prospectus to its customers who have advised Underwriter that they do not have an email address or internet access.
10. Funds will be transferred from the brokerage accounts of all successful bidders to the clearing agent in accordance with the usual and customary procedures for settlement in accordance with Rule 15C61. At settlement, the clearing agent will pay to the issuer an amount equal to the aggregate offering price for 100% of the underwritten securities, plus the aggregate exercise price of any securities purchased by Underwriter upon the exercise of any overallotment provision, less the underwriting spread. Underwriter's obligation to purchase such securities at settlement is not contingent on the performance of the selected dealers or investors.

An "Example Plan of Distribution" is attached as "Addendum A" which is incorporated herein by this reference.

Overview of Auction System

A typical user of an Auction System is a General Investor—retail investor, institutional investor, or money manager—who buys equity offerings (IPO's, secondary offerings, insurance demutualizations, debt offerings, and other capital formation processes.

The User ordinarily will access the Auction System through a brokerage account. In the Preferred Embodiment, the Introducing Broker, which holds the brokerage account, provides communications facilities for users to enter bids from their brokerage accounts into the Auction System, to modify or cancel these bids, to review the status of these bids, to track the history of the bids, and, finally, to determine what bids were successful and ultimately filled.

Through the Brokerage Account or through an independent information source (which, in the Preferred Embodiment is a web site), the user will have access to a Prospectus or other description of the offering and other information content, such as on-line roadshows.

The User will reach his/her brokerage account via the Internet, which provides a broad base of distribution. In a preferred embodiment, the brokerage account is on-line, but access to the Auction System can also be provided via the telephone, automated voice recognition systems, mail systems, or any means that allows the Typical User to reach a brokerage account.

In the Preferred Embodiment, Users will submit their bids to the Auction System electronically via an on-line brokerage account. Users will indicate the particular security (typically by entering the company name or ticker symbol), the number of shares they wish to purchase, and the price they are willing to pay.

In the Preferred Embodiment, bids submitted via an on-line system will be interpreted by the brokerage transaction system as GTC (good-until-cancelled Limit Orders) orders.

In the Preferred Embodiment, bids submitted via an on-line system will be routed via the brokerage Order Management System to an Auction Server.

In the Preferred Embodiment, the Auction Server will collect and store all bids submitted for all offerings.

In the Preferred Embodiment, at the end of an Auction Period, the Auction Server will conduct an auction on the submitted bids for a particular offering via an auction algorithm.

In the Preferred Embodiment, the algorithm is of a general type of algorithm sometimes referred to as a Vickery Auction (also sometimes referred to as a Dutch Auction), whereby all bids are ranked from highest price to lowest price and a prescribed price (called the clearing price) at which a prescribed amount of offered shares can be sold is determined. In a present embodiment, the prescribed price is the highest price at which all offered shares can be sold, and the prescribed amount of shares is, of course, all of the offered shares. Moreover, in a preferred embodiment, all bids above the clearing price are filled and all bids at the clearing price are filled on a pro-rata basis, though any number of variations of the basic algorithm could be employed consistent with the invention.

In the Preferred Embodiment, filled orders (executions) are routed back to the Order Management System of an Introducing Broker, who then routes the fills to the individual accounts of successful users.

In the Preferred Embodiment, clearing and settlement of executions are handled according to SEC and NASD requirements by the clearing agents.

Conducting an Auction

One purpose of a system in accordance with the invention is to allow wide and fair participation by both institutions and individuals in the pricing and allocation of public offerings of stocks. Another purpose is to place the stock in the hands of long-term investors. Yet another purpose is to provide a cheaper mechanism to raise capital for companies seeking liquidity that will not cause undue dilution of pre-offering shareholders.

Market Segmentation and User Profiles

In a current embodiment, the market for an offering using an Auction System in accordance with the invention is segmented into two groups. Although this segmentation is not essential to practice of the invention. The first group includes retail investors: individual investors who trade for their own accounts. An important sub-segment are those individuals who maintain accounts with electronic brokerage firms and have a high degree of comfort with the Internet and obtaining information there. Awareness of a particular auction can result, for example, from promotions directed at the company's customer base (especially in the case of branded consumer goods) as well as marketing through an Underwriter's brokerage partners (e.g. hot-button links to an Auction System Web site from an on-line brokerage partner's own Web site).

As described below, nonqualified individual investors can enter bids through a broker, who would gain a reallowance on the trade and ensure there is sufficient funding in the brokerage account to cover the transaction. Individuals without brokerage accounts can be directed to one of the Underwriter's brokerage partners. The second group includes professional money managers and institutional investors. Some professional investors may wish to route bids through their brokerage accounts via telephone or dedicated terminals while others may wish to enter bids directly over the Internet and settle transactions through an existing account. For direct bidders, the Auction system may require a mechanism to ensure that there are sufficient funds in the account to settle the transaction. Partnerships with brokerage houses that have a large installed base of dedicated terminals could provide interesting marketing opportunities for offerings as well as a means to ensure secure and valid bids.

Typical Process Flow

The Auction System handles two classes of investors (qualified and nonqualified investors). Only qualified investors will be able to place bids during the auction to minimize the possibility of prank bids and defaults on payment. Qualified investors will generally include institutions, a group of on-line brokerage firms partnered with an Underwriter, certified financial advisors who manage multiple accounts, and other groups subject to SEC or NASDAQ oversight. Alternatively, a Qualified Investor may be defined according to NASDAQ's definition of an Institutional Investor, which belongs to one of the following categories: (a) banks, savings and loan associations, insurance companies, or registered investment companies; (b) investment advisors registered under Section 203 of the Investors Advisers Act of 1940; (c) any other entity—whether a natural person, corporation, partnership, or otherwise -with total assets of at least $50 million.) A non-qualified investor who does not have an account through a qualified investor can participate by opening an account with one of the designated on-line brokerage firms.

Any investor, however, will be able to view equity offering information at the auction Web site. In a present embodiment, investors without Internet access will be able to order offering information and establish brokerage accounts through a voice-response system that will be maintained by brokerage firms partnered with the Underwriter. Typical content includes a short description of the company and its business, pricing "guidance" from Underwriter No. 1, a prospectus, a description of the offering, auction guidelines and rules, instructions on how to open a brokerage account (with hot links), road-show materials, registration forms, disclaimers, etc.

Investors should have Internet-connected client computers equipped with Web type software browsers to review offering-related materials posted at the auction Web site. In addition, qualified investors who wish to submit bids directly via the Internet should have software installed to send and receive secure e-mails and documents. As noted above, investors without on-line access will be able to obtain documents and open brokerage accounts to participate in the auction through a voice-response system.

The process steps outlined below apply to on-line investors and qualified investors.

Investors open the auction Web site by pointing to the appropriate URL. Access to the site requires registration. This ensures that the system captures information about all investors with potential interest in the stock. A password may be required at this level to verify e-mail address.

Registered investors can review and print pricing "guidance," a prospectus summary, the entire prospectus, etc. Road-show materials may be subject to restrictions and not available for printing. Video or audio recordings of road-show appearances, which can be streamed over the Internet, may be provided in order to provide access to management briefings and responses to questions. The prospectus may be available on floppy disk or CD; printed versions may be offered to investors who make requests via the touch-tone telephone system. An Auction Order Handler enters registration information into an account database and initiates an audit trail (a privacy policy can be clearly stated on the web site).

Qualified investors who will be submitting bids must also register at the bid site and provide information that identifies them as a qualified bidder (e.g. SEC registration numbers, appropriate membership numbers, institutional identifiers, account information, etc.). They also may be required to send via secure e-mail with digital signature a message that confirms their bid registration. Bidder cinoyters may be equipped with an agreed-upon security system for sending and receiving encrypted messages.

For individual investors, a third-party Certificate Authority may be required in order to validate a bidder's digital signature and to send a confirmation notice to the Auction System. Potential bidders may be required to register digital signatures with the Certificate Authority prior to auction.

Alternatively, individual investors may be required to submit bids through brokerage accounts rather than employ digital signatures, the use of a brokerage account and the safeguards ordinarily associated with such may provide adequate authentication of individual investor bids.

Upon validation of a bidder, the Auction Server may send via secure e-mail, a confirmation with password and auction number.

An auction Order Handler updates accounts database and audit trail.

Bidder registration closes prior to auction.

When an auction period opens, qualified investors may submit bids. Bid sheets on a Web page can be accessed only with a password. Bidders may use passwords to access their account data and cancel bids. Bid traffic may be encrypted.

An Auction Server sends confirmation of bid (preferably via secure e-mail).

An Auction Order Handler updates accounts database and audit trail.

An Auction Engine updates bid stack for each valid bid.

At close of the bidding period, an Auction Engine runs an auction algorithm and determines pricing.

An Auction Order Handler determines allocation, reports results to issuer company, and updates accounts database and audit trail.

An Outside Auditor may be employed to review auction results.

The issuer company accepts or rejects auction results.

An Auction Server reports results to bidders and Clearing Agent (preferably via secure e-mail) and requests payment.

Clearing Agent completes auction transactions.

Content of Web Site

Web pages include following information:

Auction title (legal name of company).

Short description of company and its business with hot links to:

Pricing "Guidance."

Prospectus summary.

Full text of Prospectus.

Auction rules.

Offering information:

Number of shares offered.

Minimum accepted bid price.

Size of bid lots (can submit lots with different prices).

Bid registration period.

Bidder qualifications.

Name of Certificate Authority and instructions for registering digital signature.

Name of Clearing Agent

Methods for providing payment and when payment is due.

Disclaimers.

Registration form and instructions.

Bid registration form and instructions.

Road-show materials

FAQ's.

Presentation.

Threaded discussion.

Updates.

Streaming video/audio (see IPO.com).

Database design.

Note: Complete description of fields will be provided later.

Documents Database:

Accessible by Auction Web Server

Contains large text files, such as:

Pricing "Guidance."

Prospectus materials.

Company background.
Auction results.
Etc.
Multimedia files.
Search engine.
Accounts Database:
Accessible by Auction Order Handler.
Contains registration materials and audit trail, which documents actions taken by users and user-related actions taken by Auction Server and Auction Order Handler.
Algorithms
Pricing (based on number of shares offered).
Order all valid bids by price in descending order.
Starting from the Bid with the highest price and working in descending order, sum up the number of shares bid to determine the Rolling Accumulation.
The offering price is the bid price at which the Rolling Accumulation passes the number of shares offered.
Pricing (based on capital raised).
Order all valid bids by price in descending order.
Starting from the Bid with the highest price and working in descending order, sum up the number of shares bid to determine the Rolling Accumulation.
The offering price is the bid price at which the Rolling Accumulation multiplied by that bid price surpasses the target capital amount.
Allocation
All investors with bid prices included in the Rolling Accumulation will be allocated shares.
Investors with bid prices above the offering price will be allocated their entire bid quantity.
Investors with bid prices equal to the offering price will be allocated a fraction of their bid quantity according to a formula to be defined later.
Transaction Server Components
Referring to the illustrative system diagram of FIG. 1, there is shown an illustrative system level drawing of a transaction server 100 in accordance with a presently preferred embodiment of the invention. In operation, a user may access a wide area communications network such as the internet 102 through a user terminal 104. The terminal 104 may be a personal computer or any device that provides interactive access to the communications network. The user may access an internet Research Information Server 106 by entering the appropriate URL for the Information Server. The Research Information Server 106 provides information concerning an offering. For example, it may provide a full text of a prospectus that describes the proposed offering and may provide an explanation of the rules that will be followed in conducting the offering. These rules may include the rules whereby equity shares in the offering are auctioned on-line over the internet, for example.
The user terminal 104 also may communicate with the transaction server 100 through the communications network, such as the internet 102. The user enters a URL corresponding to the transaction server 100 in order to establish a communications link with the transaction server. A firewall 108 provides security between the transaction server 100 and the internet 102. In a presently preferred embodiment, there are load balancing mechanisms, identified as Hydra Web-1 110-1 and Hydra Web-2 110-2 that are used for load balancing and fault tolerance. Basically, the transaction server, in a present embodiment, comprises a pool of web servers (only two shown) Web transaction server 103-1 and Web transaction server 103-2 are operationally disposed behind the firewall 108. The Hydra Web-1 110-1 and Hydra Web-2 110-2 serve to balance the load of connections between the multiple web servers (only two shown) 103-1, 103-2 that make up the transaction server 100. Also, in the event that one of the multiple web servers 103-1, 103-2 of the transaction server 100 becomes unavailable, then one or more other web servers of the transaction server 100 may take over the operations of the web server that has experienced a fault. In this matter, the connection load is balanced between the web servers in the pool, and fault tolerance can be achieved more readily.

A first auction database 112-1 and a second auction database 112-2 store information concerning an auction transaction such as auction parameters and even constraints applicable to particular customers who might want to submit bids in connection with the auction. An example of a constraint is a limitation on the total number of shares that may be sold to any one customer. Information can be entered into the first and second databases 112-1 and 112-2 through an access terminal 114 that can be accessed by a administrative terminal 116. In a presently preferred embodiment of the invention, the access terminal 114 employs a graphical user interface.

An account information computer system 118 stores and manages customer account information. Orders submitted by a user such as a user of user terminal 114 are reformatted by the account information computer system 118 into messages that may be sent out via network connections 120-1, 120-2 and 120-3 to market centers such as the NYSE 122, NASDAQ 124 or an auction server 126. In operation, a user submits a bid order in connection with an auction by making a internet connection through user terminal 104 to the transaction server 100 through the firewall 108 and either Hydra Web-1 110-1 or Hydra Web-2 110-2 to a web server 103-1 or web server 103-2. Assuming that the connection is made through Hydra Web-1 110-1 and web server 103-1, then, in a present embodiment, an Interactive Internet Server manages the assembly of Active Server Pages (ASP) of the type made available by Microsoft Corporation. These ASPs are dynamic in that they are produced based upon criteria such as the business rules associated with the particular auction transaction and the appropriate information to be displayed to a particular user. The dynamic production of the ASPs depends upon various sets of business objects resident on the web server 103-1 and connections between the web server 103-1 that manages the production of the ASPs and the auction database 112-1.

Furthermore, when a user submits a bid through a web connection, the account information computer system 118 attaches account information associated with the user to auction bid information contained in an auction database 112-1, 112-2. In this matter, a user bid is associated with a user account and with any auction parameters that may have been set in connection with the auction on which the bid is made. A bid message is created by the account information computer system 118. The bid message is transmitted via a network connection 120-3 to an auction server 126. The Auction server 126 executes an algorithm to determine the price of the offering. The Auction Server also may execute an algorithm to determine the allocation of shares in the offering. The price and allocation information may be communicated via a message on a network connection 120-3 back to the account information computer system 118. For example, such message may indicate share price and share allocation for any given customer. The computer system 118 associates auction share price and each customer's allocation to the customer's account. It also reports that information to the first and second auction databases 112-1, 112-2. The first and second auction databases 112-1, 112-2 are synchronized databases such that each contains identical information. In this manner, the account information computer system 118 places "fills" into a customer account if in fact the customer's bid has been successfully accepted. An administrative terminal 128 and a Customer Service Representative Terminal 130 may access the account information computer system 118. Alternatively, they may access the transaction server 100 interface via a direct network connection 132-1, 132-2 or via an Internet connection 134 as illustrated.

Administration of the Auction Process

Figure 2A:
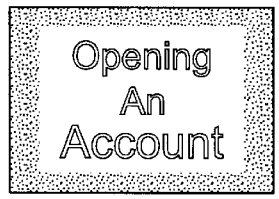
FIGS. 2A and 2B are pictorial illustrations of the process of opening a brokerage account in accordance with a presently preferred embodiment of the invention.
Figure 2A:
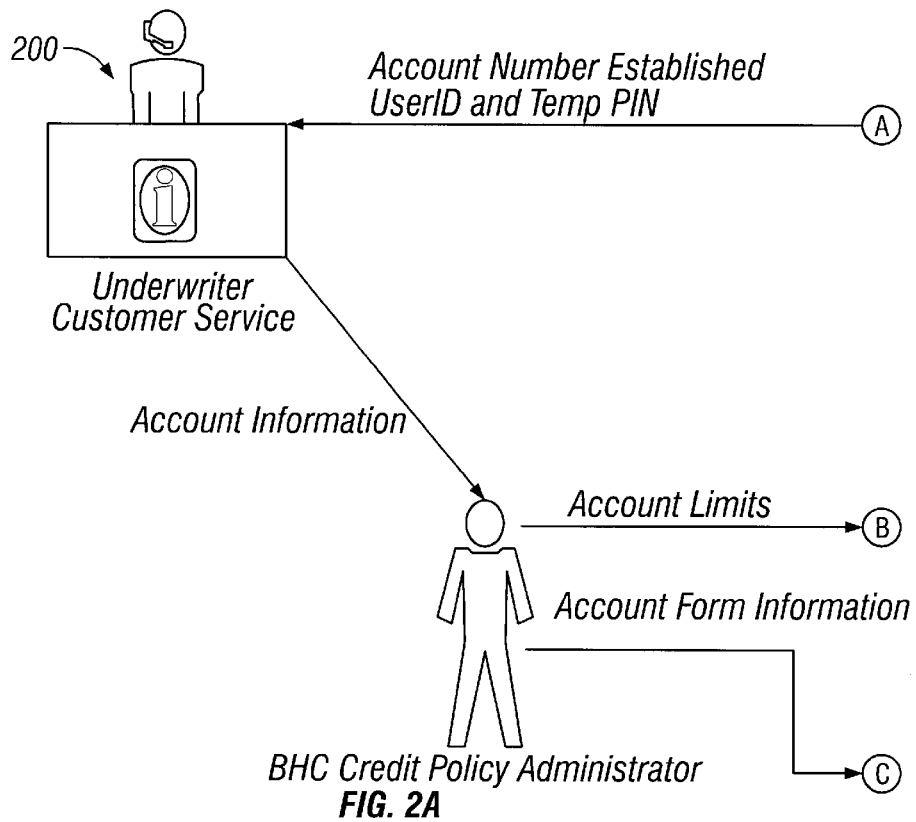
Figure 2B:
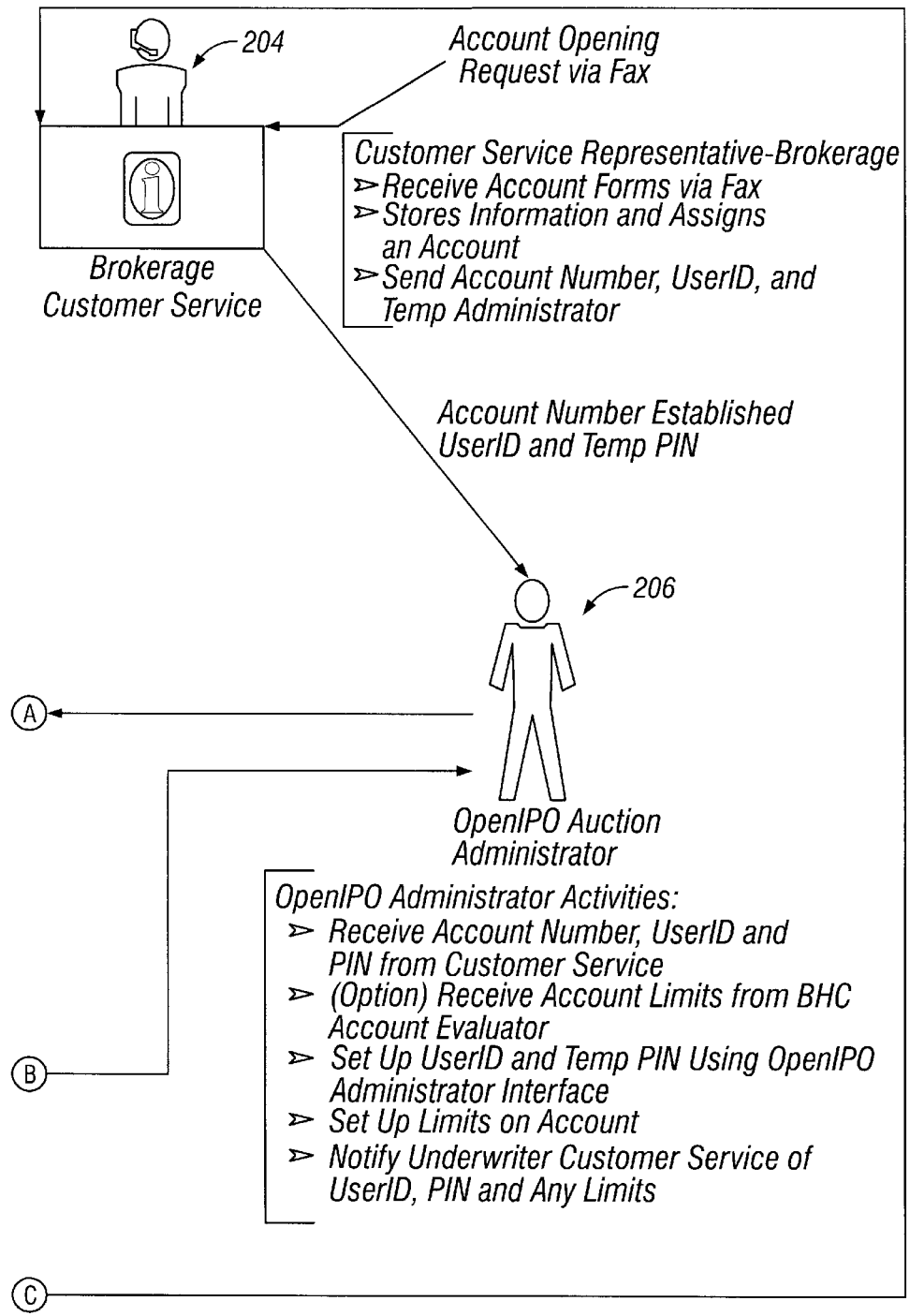

Referring to the illustrative drawings of FIGS. 2A and 2B, there is shown a pictorial illustration of the process of opening a brokerage account. Bids for the purchase of securities over a network such as a computer network like the Internet may be submitted through such a brokerage account. Accounts may be opened using any of numerous services. For instance, an underwriter customer service 200, a brokerage customer service 202 or an auction administrator service 204 each may be employed to open an account. It will be appreciated, that the account opening services described in connection with FIGS. 2A and 2B are of the general type that would be employed by retail customers. Institutional customers, for example, might have accounts opened by telephone through a service agent. The information gleaned through these services, for example, is entered for use by the account information computer system 118. Moreover, it will be appreciated that the types of information that is gleaned from customers in connection with the opening of an account may be obtained through an on-line connection, such as an Internet connection. However, often it will be a requirement that the customer print out a document setting forth the information required for the opening of the account. This document will have to be signed and mailed or otherwise delivered to an entity that may open the account by assigning a user ID and a PIN number to the customer.

Moreover, it will be appreciated that for certain institutional customers, account limits may be set, for example, based upon the credit worthiness of the institutional investor. In general, retail customers must actually fund their account up to at least the amount of a bid submitted for a security in order for the bid to be accepted. In other words, institutional investors may be permitted to submit bids based upon credit policies, but retail customers will have to have actual funds in their account sufficient to cover a bid in order to submit a bid for an auction of securities.

Figure 3A:
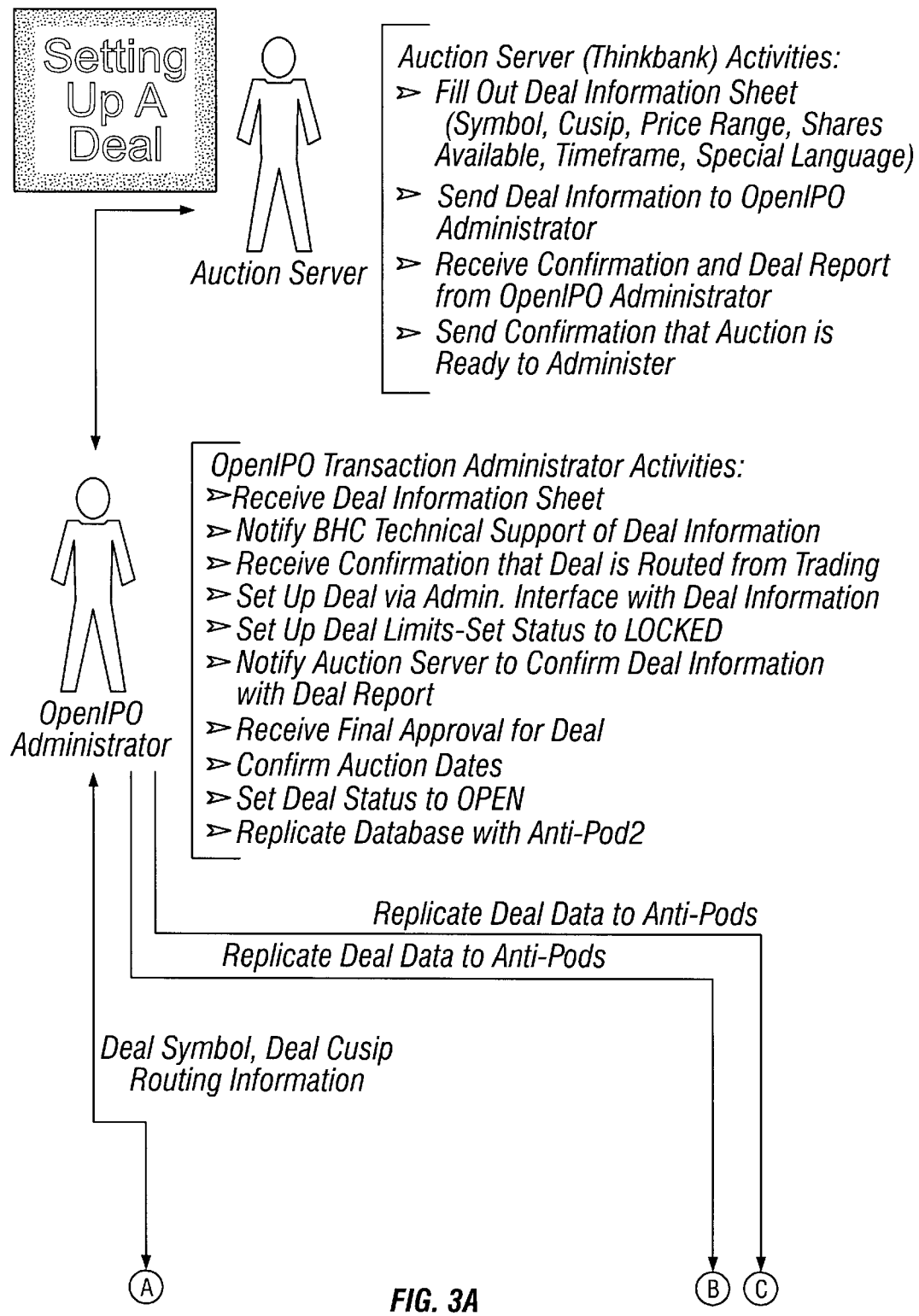
FIGS. 3A and 3B are pictorial illustrations of the process of setting up a "deal" for the underwriting of securities in accordance with a presently preferred embodiment of the invention.
Figure 3B:
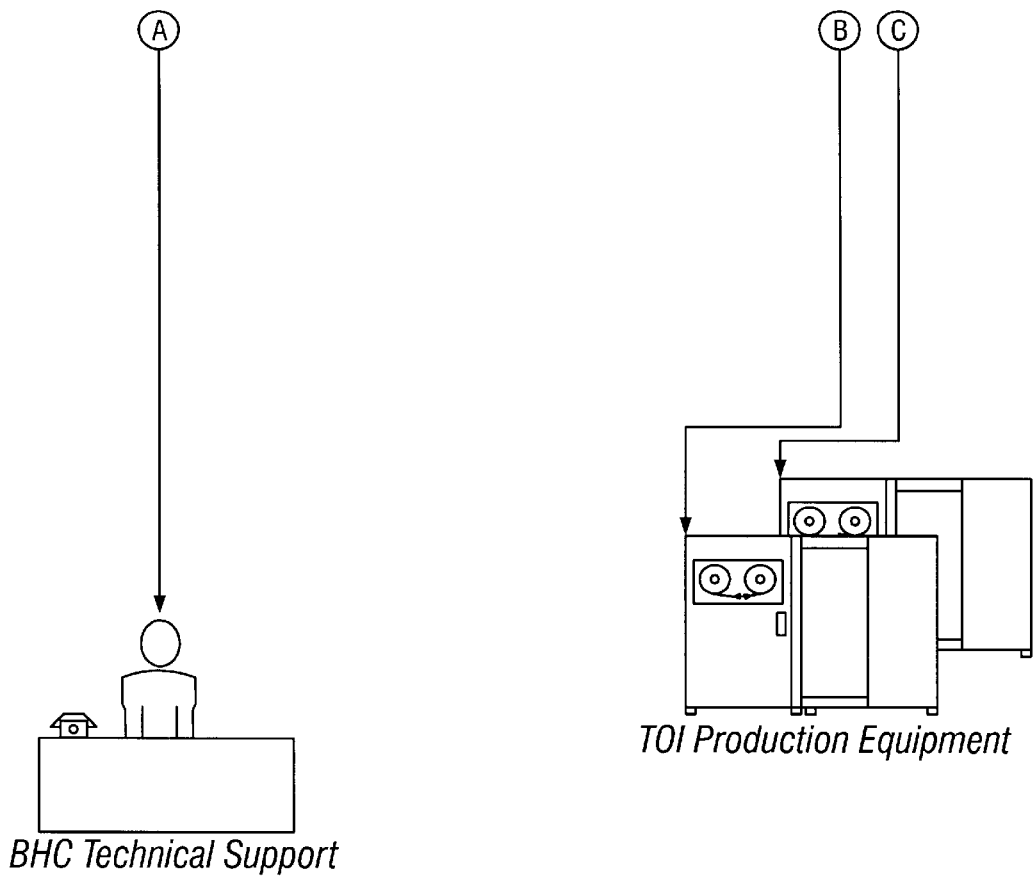

The illustrative drawings of FIGS. 3A and 3B show in general the process for setting up a deal. A deal as the term is used in this section, refers to a particular underwriting of securities. The auction administrator sets up the appropriate transaction information in the transaction server 100 and the auction server 126. This includes entering deal information which may include information such as the symbol to be used to designate the company. For instance, a NASDAQ style symbol may be employed. It also may include parameters such as the proposed price range for the deal, the number of shares expected to be sold, the time frame for the deal such as the expected opening date and closing date of the deal and special parameters associated with the deal such as a limit as to the number of shares in the offering that any given person or institution may purchase. For instance, there may be a limitation that no person or institution may purchase more than 10% of the offering. The deal information employed on the transaction server 100 must be the same as that used on the auction server 126. Administrators also set up the deal information on the account information computer systems. There should be a notification to account information systems sufficient to ensure that the account information systems correctly route messages that pertain to bids on an auction deal. For instance, a symbol selected to represent a new offering should be set in an account information computer system 118 so that the system routes any message containing a symbol corresponding to the offering issuer to the auction server 126, rather than to the NYSE or the NASDAQ. It will be appreciated that, after the deal closes, and an offering is completed, then the routing in the account information computer system 118 can be changed so that the symbol corresponding to the issuer will result in messages for orders relating to the issuer (after market orders) to be sent to the appropriate market center, such as the NYSE or the NASDAQ.

The administrators also should ensure that the auction deal data is replicated on each of the auction databases 112-1, 112-2, , sometimes referred to as anti-pods (points of delivery). Generally, technical support personnel will ensure that the auction deal information is properly received, that routing for the auction symbol is properly set up and to send confirmation to the auction administrator that the overall system is ready.

Figure 4A:
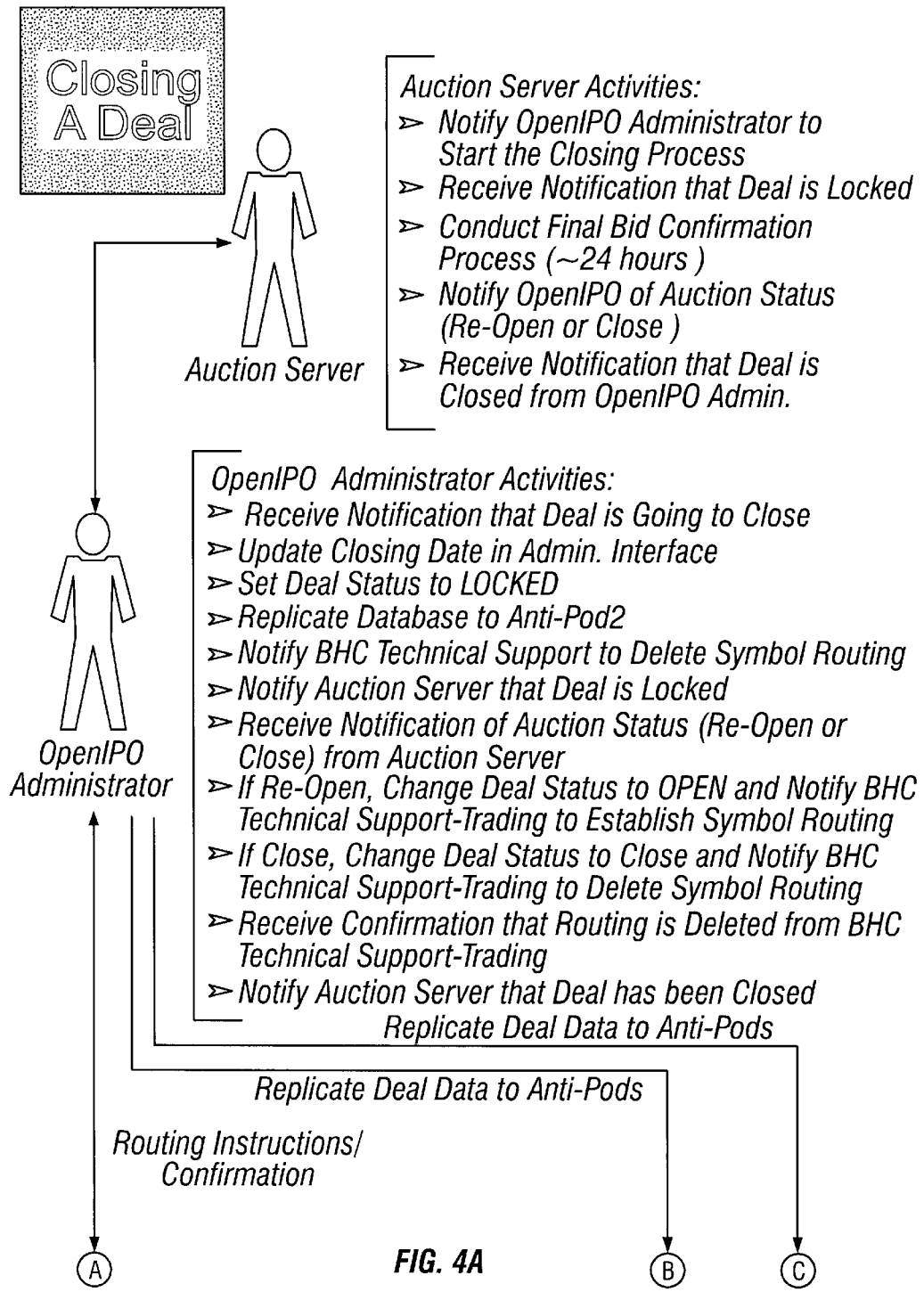
FIGS. 4A and 4B are pictorial illustrations of the process of closing a "deal" for the underwriting of securities in accordance with a presently preferred embodiment of the invention.
Figure 4B:
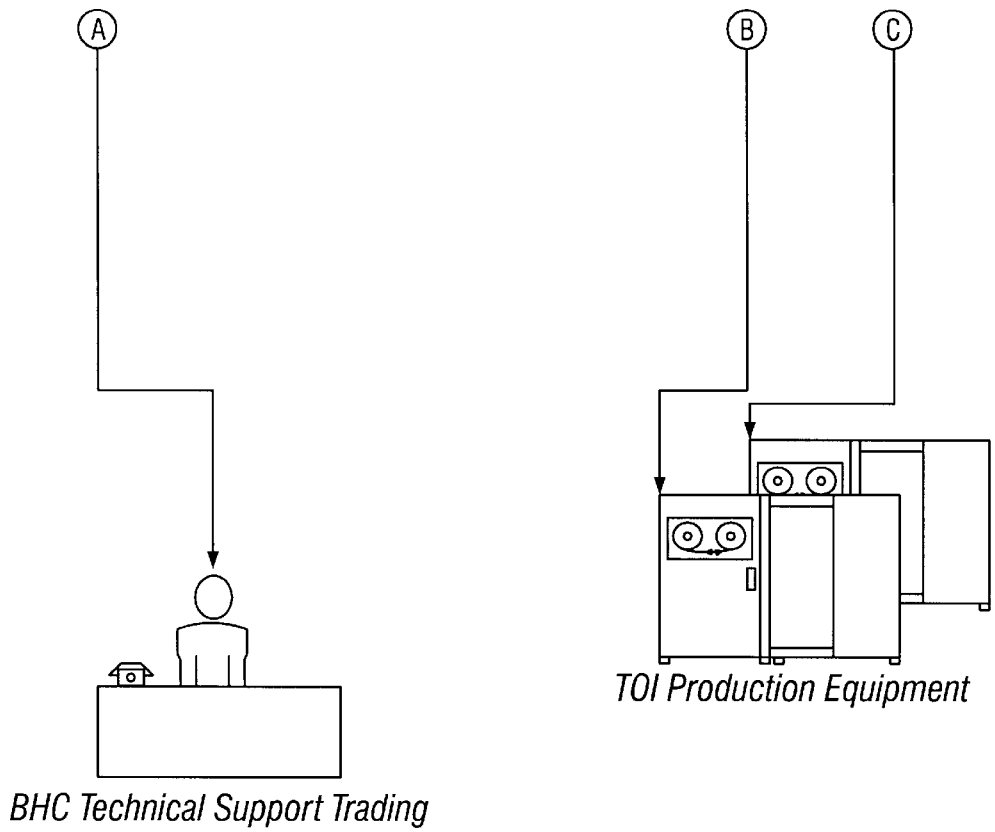

The illustrative drawings of FIGS. 4A and 4B show in general terms the process for closing a deal. It will be appreciated that, in accordance with a presently preferred embodiment of the invention, a prospectus pertaining to a transaction that is the subject of an auction may require approval by the SEC. If so, the transaction generally cannot become "effective" until the SEC approves the transaction. It is not uncommon for a transaction's prospectus to go through numerous changes between the time it is initially submitted to the SEC and the time that the SEC finally approves the prospectus and permits the transaction to become effective. In general, once the SEC approves a transaction, the transaction may become "effective". Ordinarily, once the SEC approves the transaction, the underwriter and the issuer company execute an underwriter agreement in which the issuer company approves the sale of securities by the underwriter at an agreed upon price. In accordance with a present embodiment of the invention, the agreed upon price of securities to be sold by the issuer is established through an auction process of the general type described herein.

It will be appreciated, however, that although a clearing price is arrived at through the process described herein, the auction process and underwriter agreement may specify an actual offering price that is different from, though based upon, the offering price. For instance the offering price could be set at the next highest bid below the clearing price.

After the deal has become effective, and the underwriter and the issuer have agreed upon a price for the issuance of the shares, the underwriter takes steps to firm up the bids that have been received for the auction. Once the underwriter firms up the bids the underwriter sends "fills" to the customer accounts and a settlement at the clearing price which has been arrived at through the auction process.

In a present embodiment of the invention, before the transaction becomes effective, the underwriter does not form binding contracts with customers who submit bids for securities. Rather, bids are mere "indications of interest" in purchasing the security. Thus, in a present embodiment, the underwriter takes the risk that a bidder will back out of the bid and not actually follow through and purchase the securities at the clearance price.

Alternatively, for example, the auction can be run with rules that call for firm bids. Under such rules the bids would in fact be binding contracts. Nevertheless, such modified rules may specify that bids are revocable and modifiable until the auction closes.

Moreover, in a current embodiment of the invention, there is uncertainty as to when an auction for a particular security issue will close. The closing date depends in part upon the timing of SEC comments on the transaction and approval of the transaction. At a point when an underwriter feels that the prospectus is in a close to final condition, then the underwriter may inform the SEC that it is "ready for acceleration". At this point, the underwriter may inform customers and potential bidders that the auction will close soon, perhaps within twenty-four (24) hours. This gives bidders an opportunity to change their bids and even to rescind their bids. When the transaction becomes effective, the auction will close. Pricing and allocation of the transaction are then determined based upon the results of the auction as described elsewhere in this document.

It will be appreciated that the auction process described herein achieves the result of "building a book", a traditional role of a banker. In building a book, a banker identifies persons or institutions who are likely to purchase securities. The banker also ascertains a price that is likely to be acceptable to the purchasers. The auction process described herein replaces the traditional process of building a book with a process that involves accepting bids and establishing an allocation and a clearance price based upon the results of the auction.

Figure 5:
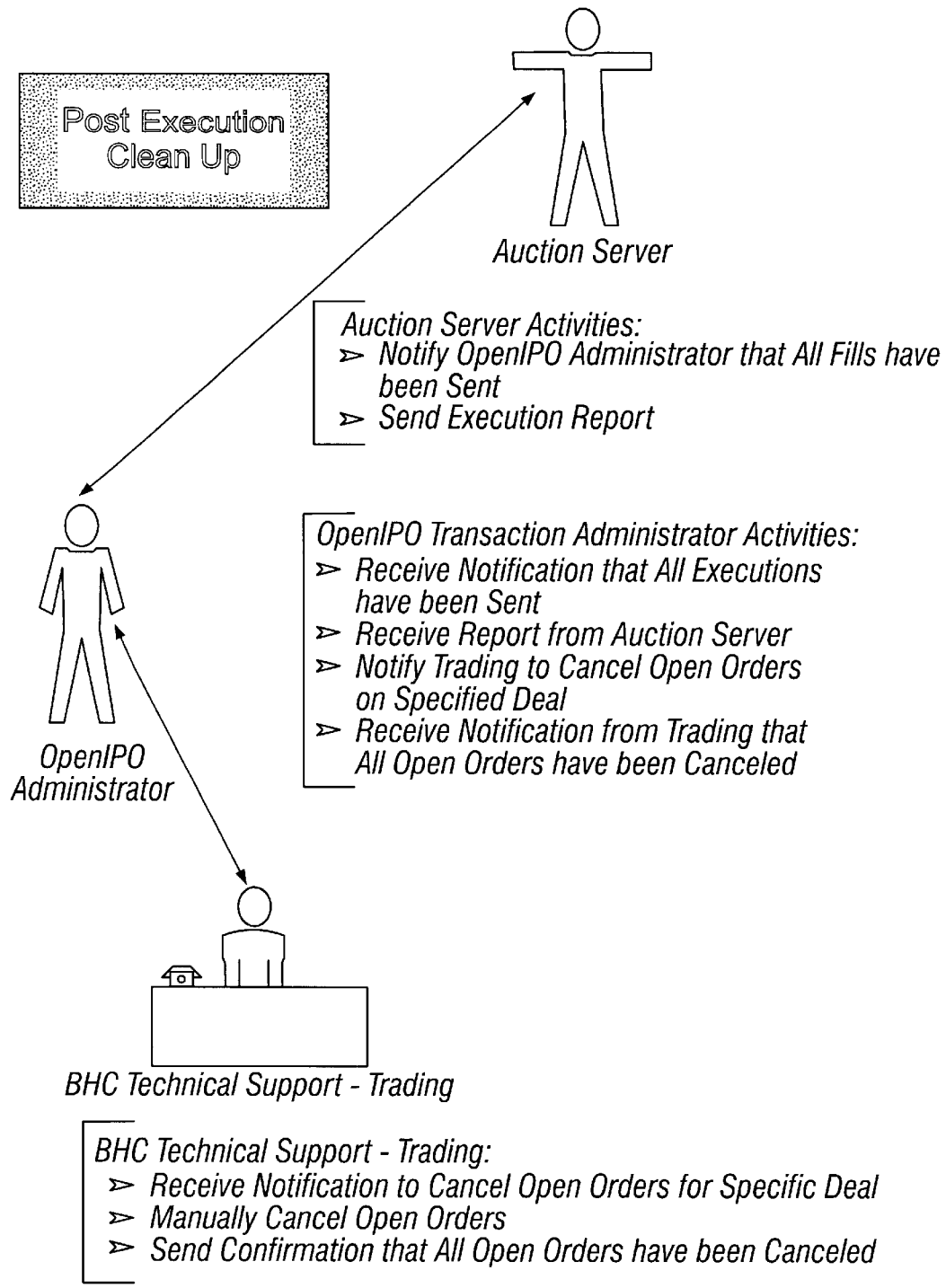
FIG. 5 is a pictorial illustration of the process of post-execution clean-up after a "deal" has been completed in accordance with a presently preferred embodiment of the invention.

It will be appreciated that after an initial public offering has been completed, then bids for after market orders through the NYSE or the NASDAQ, for example, may be accepted in the normal manner through firm contracts. In other words, there is no requirement that the underwriter receive a bid and hold it as a non-binding bid. Rather, the bid may be treated as an order which creates a contractual obligation by the customer to purchase the security which has been ordered. Referring to the illustrative drawings of FIG. 5 there is shown an illustrative diagram of the processes involved in post-execution clean-up after a deal has been completed. Basically there is a need to be certain that there are matches between bids and orders and that there have been no breaks in the system. In general, a bid submitted by a customer is valid until it has been cancelled. Bids, in a present embodiment, are handled as GTC (Good Till Cancelled) limit orders. Thus, after the deal has been completed, bids that have not been accepted, for example, because they have not equaled or exceeded the clearance price are cancelled as if they were unfilled orders.

Figure 6:
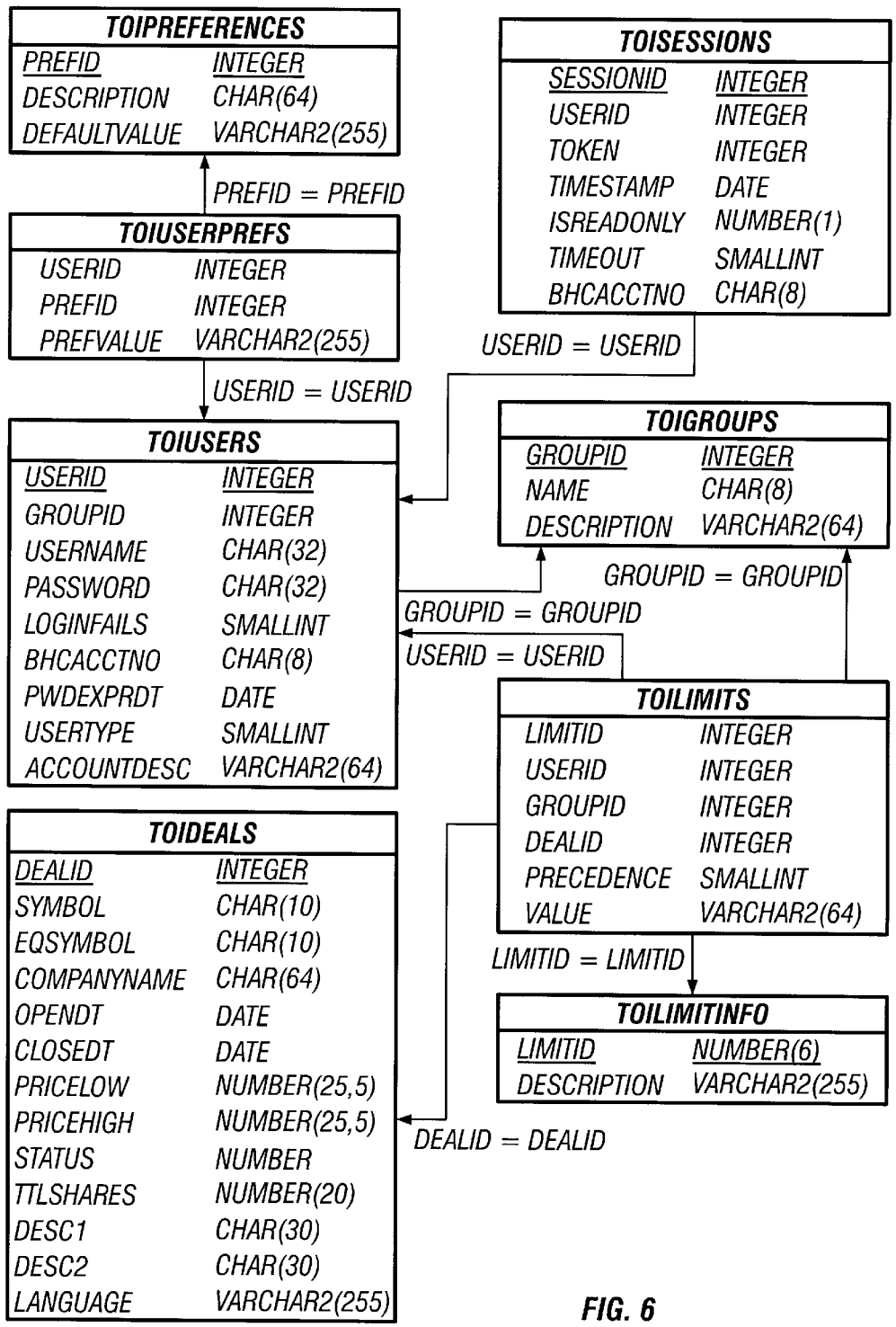
FIG. 6 is an illustrative drawing of tables that define the database schema on the transaction server of FIG. 1.
Figure 7:
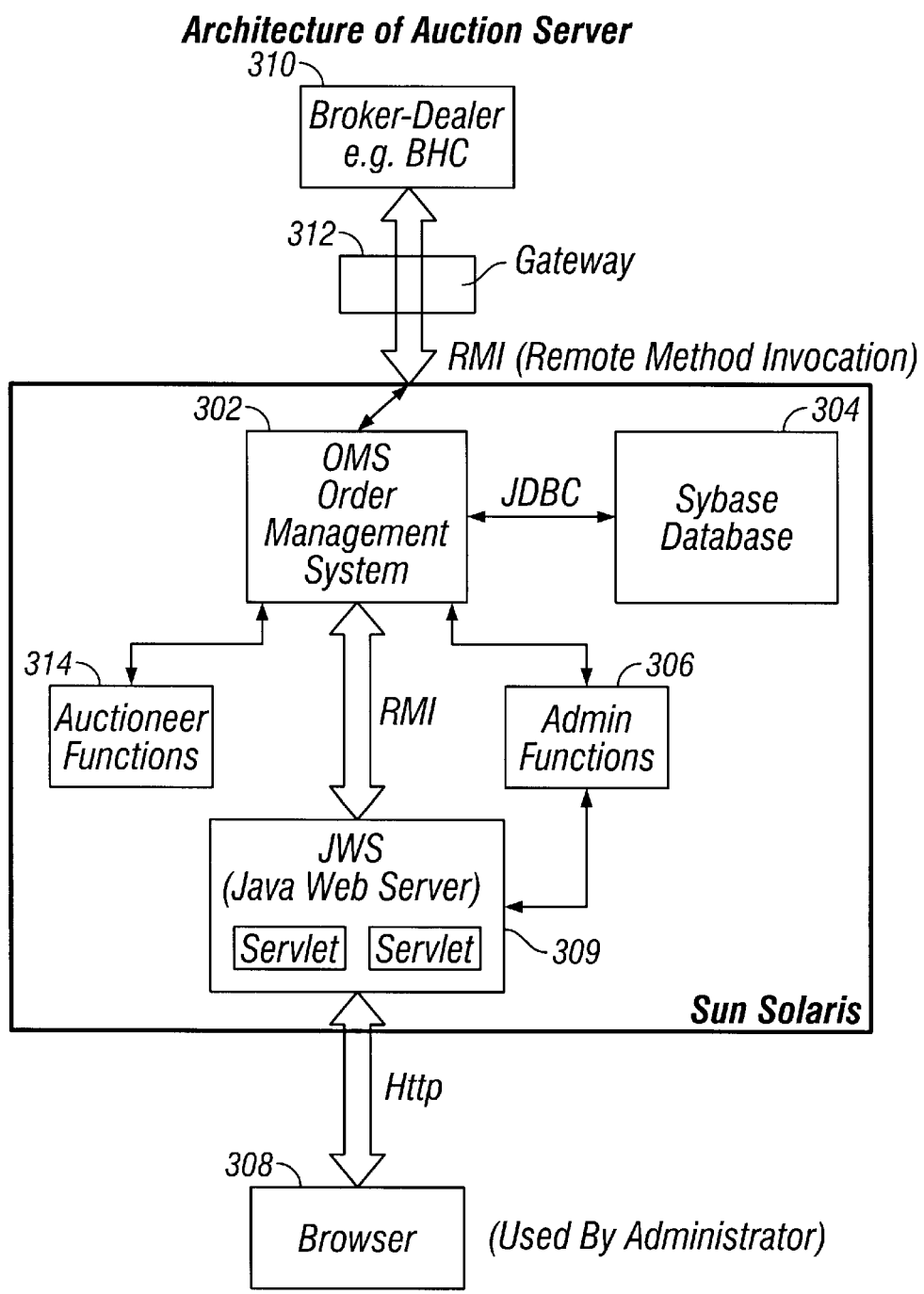
FIG. 7 is an illustrative architecture level drawing of the Auction Server of FIG. 1.

The illustrative drawing of FIG. 6 shows the table in the databases 112-1, 112-2 that define an auction transaction database schema on the transaction server 100. In operation, a user logins to the transaction brokerage site. System checks the input information based on information contained in TOIPreferences Table, TOIUserPrefs Table, and TOIUsers Table. If PrefID and Password do not match stored information, System responds with Login-Fail message. If PrefID and Password match, User session is initiated and tracked in TOISessions Table. Moreover, User's GroupID may have limits assigned to it based on parameters stored in TOILimits Table. Limits specified in TOILimits may depend on the specific deal, which is defined by parameters in TOIDeals Table. Moreover, specific deal information that appears on transaction web site is defined in TOIDeals Table.

1. List of Tables

| Name | Description |
| --- | --- |
| TOIDeals | IPO's offered by OpenIPO. The entity gives information on each IPO/Deal. |
| TOIGroups | TOI customers are classified into groups. This entity gives the different groups in TOI. |
| TOILimits | The different limits that apply to any transaction. It includes limits on users, groups, system-wide, deals and deal specific user limits. |
| TOILimitInfo | Describes the different types of limits. |
| TOIPreferences | Describes the different individual preferences that a TOI user can set in the system. |
| TOISessions | The security information of connections to the system. This information is used to validate every access to the TOI server. |
| TOIUserPrefs | Gives the values of the individual preferences chosen by the user. |
| TOIUsers | Gives details on customers using the TOI application to enter bids for the IPO. |

| Name | Type | Primary | Mandatory |
| --- | --- | --- | --- |
| DealId | INTEGER | Yes | Yes |
| Symbol | VARCHAR2(10) | No | Yes |
| EqSymbol | VARCHAR2(10) | No | No |
| CompanyName | CHAR(64) | No | Yes |
| OpenDt | DATE | No | No |
| CloseDt | DATE | No | No |
| PriceLow | NUMBER(25,5) | No | No |
| PriceHigh | NUMBER(25,5) | No | No |
| Status | SMALLINT | No | No |
| TtlShares | NUMBER(20) | No | No |
| Desc1 | VARCHAR2(30) | No | No |
| Desc | VARCHAR2(30) | No | No |
| Language | VARCHAR(255) | No | No |

2.1. DealId
Unique Internal number to identify a deal.
2.2. Symbol
Temporary auction symbol assigned to the company for which the IPO is being offered. The symbol may not yet have been accepted by the SEC.
2.3. EqSymbol
Final equity symbol assigned to the company for which the IPO is being offered.
2.4. CompanyName
Name of the company for which the IPO is being offered.
2.5. OpenDt
Date and time the deal will be open to TOI users to place their bids.
2.6. CloseDt
Date and time, after which no more bids will be accepted for the IPO.
2.7. PriceLow:
Lowest price, that can be bid for a share of the Deal.
2.8. PriceHigh
Highest price, that can be bid for a share of the Deal.
2.9. Status
Status of the deal. Values:
   0:CLOSED
   1: OPEN

2: LOCKED
3: DELETED
4: INHIBITED
5: EXECUTED

2.10. TtlShares
Total number of shares offered in the IPO for the company.

2.11. Desc1
Part 1 of a string used to verify with BSS auction, that the deal for which the order is being placed, is indeed the correct company.

2.12. Desc2
Part 2 of a string used to verify with BSS auction, that the deal for which the order is being placed, is indeed the correct company.

2.12. Language
Special instructions (Language) associated with the IPO.

2.12. Index List

| Index Code | P | F | U | Column Code | Sort |
|---|---|---|---|---|---|
| TOIDEALS_PK | Yes | No | Yes | DealID | ASC |

3. TOIGroups
3. Column List

| Name | Type | Primary | Mandatory |
|---|---|---|---|
| GroupId | INTEGER | Yes | Yes |
| Name | VARCHAR2(8) | No | Yes |
| Description | VARCHAR2(64) | No | No |

3.1. GroupID
Unique Internal number to identify a group.

3.2. Name
The name of the group.

3.3. Description
An arbitrary description assigned to the group.

3.3. Index List

| Index Code | P | F | U | Column Code | Sort |
|---|---|---|---|---|---|
| PK_TOIGROUPS | Yes | No | Yes | GROUPID | ASC |

TOILimitInfo
3.3.1. Column List

| Name | Type | Primary | Mandatory |
|---|---|---|---|
| LimitId | INTEGER | Yes | Yes |
| Description | VARCHAR2(64) | No | No |

3.4. LimitId
Unique internal identifier for a type of limit.

3.5. Description
A brief description of what the limit is.

3.5. Index List

| Index Code | P | F | U | Column Code | Sort |
|---|---|---|---|---|---|
| PK_TOILIMITINFO | Yes | No | Yes | LIMITID | ASC |

TOILimits
3.5.1. Column List

| Name | Type | Primary | Mandatory |
|---|---|---|---|
| LimitId | INTEGER | Yes | Yes |
| UserId | INTEGER | Yes | No |
| GroupId | INTEGER | Yes | No |
| DealId | INTEGER | Yes | No |
| Precedence | INTEGER | No | No |
| Value | VARCHAR2(64) | No | No |

3.6. LimitId
Foreign key to TOILimitInfo table.

3.7. UserId
Foreign Key to the Users table, identifying which user the limit pertains to. A '0' in this field indicates the user is not pertinent for the Limit.

3.8. GroupId
Foreign Key to the Groups table, identifying which group the limit pertains to. A in this field indicates the group is not pertinent for the Limit.

3.9. DealId
Foreign Key to the deals table, identifying which deal the limit pertains to. A '0' in this field indicates the deal is not pertinent for the Limit.

3.10. Precedence
The precedence this limit rule will take. Precedence is used to identify the limit that will apply among the different limits that apply to a particular instance.

3.11. Value
The value of the Limit.

3.11. Index List

| Index Code | P | F | U | Column Code | Sort |
|---|---|---|---|---|---|
| PK_TOILIMITS | Yes | No | Yes | LIMITID, USERID, GROUPID, DEALID | ASC |

TOIPreferences
3.11.1. Column List

| Name | Type | Primary | Mandatory |
|---|---|---|---|
| PrefId | INTEGER | Yes | Yes |
| Description | VARCHAR2(64) | No | Yes |
| DefaultValue | VARCHAR2(255) | No | No |

3.12. PrefId
Unique internal identifier for a preference type.

3.13. Description
A brief description of what the preference is and does.

3.14. DefaultValue
The default value of the preference, if it is not specifically set by the user.

Default data:
    1, 'Maximum inactivity time after which a user session is invalidated'

2, 'Customer's Primary E-mail address'
3, 'Customer's Primary Phone Number'
4, 'Customer's Primary Contact Name'

3.14. Index List

| Index Code | P | F | U | Column Code | Sort |
|---|---|---|---|---|---|
| PK_TOIPREFERENCES | Yes | No | Yes | PREFID | ASC |

4. TOISessions

| Index Code | P | F | U | Column Code | Sort |
|---|---|---|---|---|---|
| PK_TOISESSIONS | Yes | No | Yes | SESSIONID | ASC |
| REL_SESSIONS_USERS_FX | No | Yes | No | USERID | ASC |

4. Column List

| Name | Type | Primary | Mandatory |
|---|---|---|---|
| SessionId | INTEGER | Yes | Yes |
| UserId | INTEGER | No | Yes |
| Token | INTEGER | No | Yes |
| Timestamp | DATE | No | No |
| IsReadOnly | NUMBER(1) | No | Yes |
| TimeOut | NUMBER | No | Yes |
| BHCAcctNo | CHAR(8) | No | No |

4.1. SessionId
Unique Internal number to identify a session.
4.2. UserId
Foreign key to the Users table. Identifies the owner of the session.
4.3. Token
A random number used to validate a session. With every connection the user is given a new token number in an http cookie. This user must return this number to validate his active session.
4.4. Timestamp
Time and date the session was last accessed. It enables TOI to invalidate sessions that are inactive for long. A session access, that exceeds the timestamp value by the value specified in timeout, is no longer valid.
4.5. IsReadOnly
A flag used to identify if the session has permissions to write, i.e. permissions to commit data/transactions. Customer representatives are required to have user sessions with read only privileges.

Values:
  0: Read-Write privileges
  1: Read Only privileges
4.6. TimeOut
Maximum inactivity time of a session after which the session is rendered invalid. This field is de-normalized from TOIUserPrefs for ease of access and performance.
4.7. BHCAcctNo
Customer's account number at BHC. This is the identifying number used to communicate with the tandem. This field is de-normalized from TOIusers for ease of access and performance.

Index List
5. TOIUserPrefs
5. Column List

| Name | Type | Primary | Mandatory |
|---|---|---|---|
| UserId | INTEGER | No | No |
| PrefId | INTEGER | No | No |
| PrefValue | VARCHAR2(255) | No | No |

5.1. UserId
Foreign Key to the user table.
5.2. PrefId
Foreign Key to the preference table.
5.3. PrefValue
Value chosen by the user for the preference.
Default data: Default number of seconds for session timeout for all users is 1800 seconds, or 30 minutes. The default value may be overridden by a user preference, ex: (10, 1, '900') would set UserId 10's session timeout to 15 minutes. (0, 1, '1800')
5.3.
5.3. IndexList

| Index Code | P | F | U | Column Code | Sort |
|---|---|---|---|---|---|
| PK_TOIUSERPREFS | Yes | No | Yes | UserId, PrefId | ASC |
| REL_USERPREFS_USERS_FK | No | Yes | No | USERID | ASC |
| REL_USERPREFS_PREFS_FK | No | Yes | No | PREFID | ASC |

6. TOIUsers

6. Column List

| Name | Type | Primary | Mandatory |
|---|---|---|---|
| UserId | INTEGER | Yes | Yes |
| GroupId | INTEGER | No | Yes |
| UserName | VARCHAR2(32) | No | Yes |
| Password | VARCHAR2(32) | No | No |

-continued

| Name | Type | Primary | Mandatory |
|---|---|---|---|
| LoginFails | INTEGER | No | Yes |
| BHCAcctNo | CHAR(8) | No | Yes |
| PwdExprDt | DATE | No | No |
| UserType | INTEGER | No | No |
| AccountDesc | VARCHAR2(64) | No | No |

6.1. UserId
Unique Internal number to identify a user.
6.2. GroupId
Foreign key to the TOIGroups table. Identifies the group, the user belongs to.
6.3. UserName
The name, the user uses to login to the TOI application. It is the account number field in the user interface.
6.4. Password
Encrypted string supplied by the user to authenticate his use of the TOI application. It is the PIN field in the user interface.
6.5. LoginFails
Number of failed login attempts by a user with a valid username. Maximum of 5 unsuccessful attempts are permitted before the TOI system locks a user out, for possible security breach attempt. It is reset every time the user successfully logs in.
6.6. BHCAcctNo
The Account number that identifies the user in the BHC Tandem database.
6.7. PwdExprDt
Date the password expires or is no longer valid. Currently used to lock a user out.
6.8. UserType
Type of the user. Based on this type access privileges to the application are determined.
Values:
  1: TOI Customer
  2: TOI Customer Service Representative
  3: Administrator
6.9. AccountDesc
A description of the account, that the user holds at BHC.
6.9. Index List

| Index Code | P | F | U | Column Code | Sort |
|---|---|---|---|---|---|
| PK_TOIUSERS | Yes | No | Yes | USERID | ASC |
| REL_USERS_GROUPS_FK | No | Yes | No | GROUPID | ASC |

Appendix A
1.0 Database Sizing Estimates:
Based on the current Business Model, the estimates below define the initial set up along with estimated growth:
1. Start 2 deals, add 2 per month with potential to 5 per month.
2. Start 1 group, no plan for additional groups.
3. Start 20 limits, likely to stay at that level.
4. Start 20 limitinfo per deal, likely to stay at that level.
5. Start 5 preferences, likely to stay at that level.
6. Start 25 users, add 5 per month plus potential bursts of as many as 25.
7. 10 limits per user.
8. 5 user preferences per user.
9. Start 0 sessions, 1 per login, potential multiple per user per day, and will use admin batch job to clean up expired sessions. High-end estimate would be a total of 3 per user at any one time with 'inserts' and 'deletes' at an average rate of 1 per user per day.

Auction System Architecture

In a present embodiment of the invention, the auction server system 126 is a multi-protocol (HTTP, Java/RMI) client-server architecture comprised of several components. A Client API (C-API) is provided for each of the components to interact with each other. The target system can be partitioned across processor boundaries using network protocols but will initially exist on a single Sun/Sparc running the Solaris operating system. Transport protocols are secured and encrypted by the use of SSL.

An Order Management Server (OMS) 302 is the core of the system, providing the functionality of the entire system as a set of exported interfaces via a secure, distributed messaging system. Authorization and authentication are required for users to access the OMS.

The OMS 302 utilizes a commercial, off-the-shelf relational database 304 to provide transaction-oriented persistent storage. Access to the Relational Backing Store (RBS) 304 is achieved using open standard ODBC/JDBC protocols facilitating multiple vendor solutions. The initial system is implemented with Sybase System 11.

The Administrative Module (AM) 306 provides a set of client protocols and services to interact with the OMS for administrative purposes. Creation and management of the principal objects in the system (auctions, users) is the primary responsibility of the AM 306. Additionally, edit functionality of bids and fills is provided. There is a Java applet that runs in a standard browser 308 which provides these functions to the administrator. A java web server 309 provides several ports to access the auction server 126, at least one of which is an http port. A command-line application is also provided which can be used with a scripting language such as Tcl for unattended autonomous operation. Each auction is uniquely identified by an auctionId, generated by the OMS. Attributes of an auction may include a description of the offering, a start date, an end date, the size of the offering, a URL to visit for further information and others as needed. A minimum price for bids and other attributes are available on a per-auction basis. Attributes of a user include a password and access control information. Ad-hoc report generation is supported. Audit trails for bid modifications are additionally available.

A Broker Client Module (BCM) 310 provides a set of client protocols and services to interact with the OMS 302 for bid management purposes. Creation, modification, and cancellation of bids along with acceptance of fills is the primary responsibility of the BCM 310. Each participating broker will utilize a BCM 310 to provide a bridge to whatever proprietary order management system is in place at the brokerage. Design guidance is provided for a subset of standard protocols such as SIAC/CMS. Each bid is uniquely identified by a bidId, generated by the OMS 302. Attributes of a bid include the auctionId, the userId, an account number and transaction id for use by the broker, the size of the bid and the price.

Additional attributes can be added as needed. The price and the size of a bid as well as the broker transaction id can be modified after creation; additionally the bid can be cancelled. A recovery protocol exists to query a list of all bids that exist for a user, a <user,account> pair, a <user, auction> pair, or a <user,auction,account> triple. Access is limited to -bids that were placed by the user. Status of a particular bid can be queried. BCM gateway 312 can be provided to allow an underwriter administering the auction server 126. to service bids via a syndicate desk. Both a Java applet and a command-line interface will be provided for this module.

An Auctioneer Client (AC) 314 implements an auction algorithm. Running the auction and generating fills to the OMS 302 is the primary responsibility of the AC 314. The target AC 314 implements a Vickrey-type auction and provides a basis for other kinds of auctions as well. The AC begins by changing the state of an auction from CLOSED to RUNNING. It then queries the OMS 302 for a list of valid bids for the auction, calculates the auction price, allocations for each bid, and transmits a list of fills to the OMS 302. Finally, it changes the state of the Auction to FILLED.

The Auctioneer Client 314 can be extensible to different auction types, based on the "modelID" auction parameter as stored in the RBS 304. The modelID can be used to index into a table of auction parameters, which can be used to drive the parameterized auction engine.

For example, the "clearing-price" parameter will be "uniform" in the Vickrey auction (or "bid-price" in the case of a discriminatory or first-price auction). The "bidding" parameter will be "sealed" in the Vickrey auction ("open-outcry" (unsealed bids) in other auctions). The "allocation" parameter determines the allocation among low-price bidders ("pro-rata" in the Vickrey case, but other choices would be "chronological", "by-size", etc.).

Auction Server Physical Network

Figure 8:
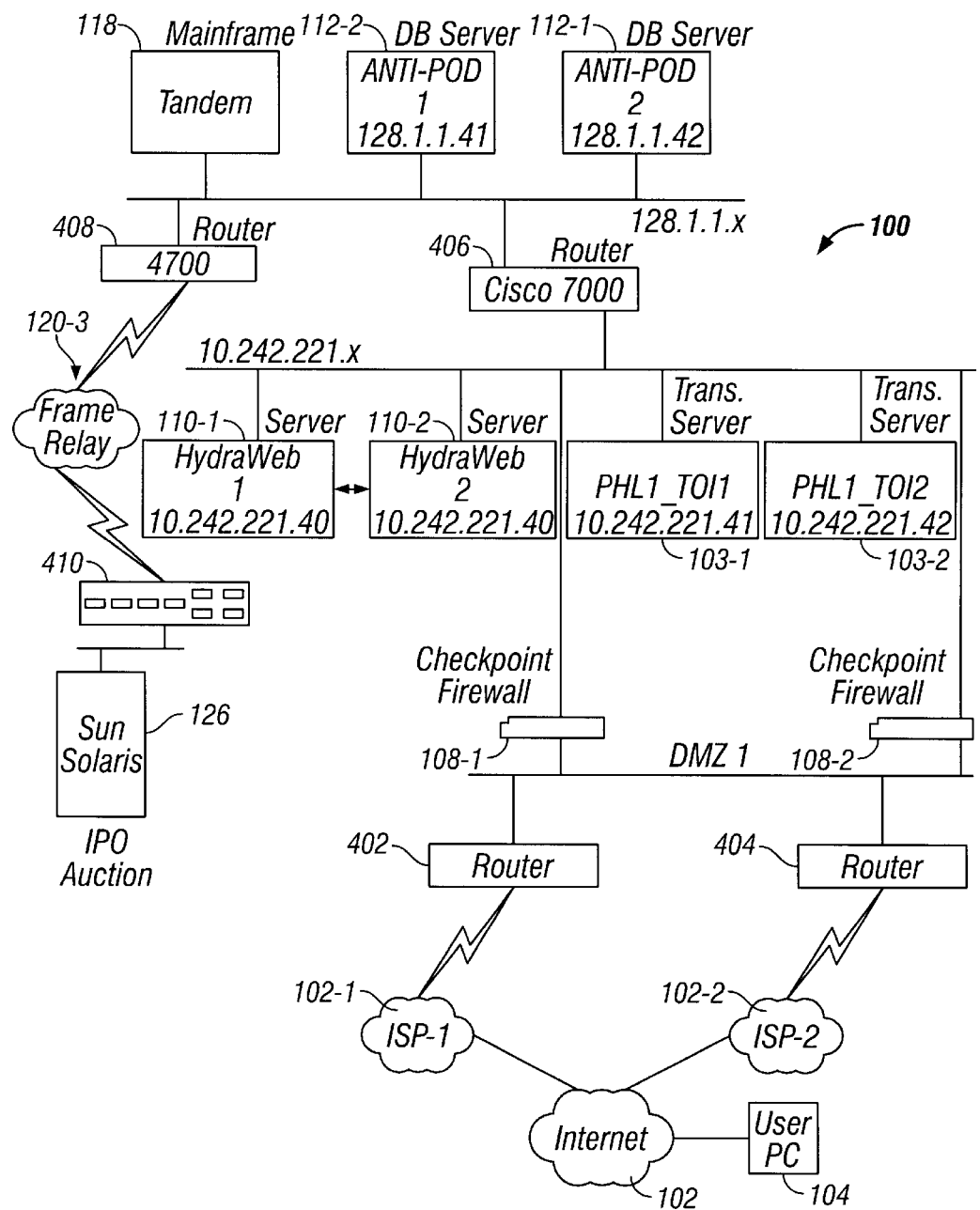
FIG. 8 is a generalized block diagram of a physical network that implements auction system FIG. 1.

Referring to the illustrative drawing of FIG. 8, there is shown a generalized block diagram of a physical network used to implement an Auction Server in accordance with the presently preferred embodiment of the invention. A User may form a connection through a User terminal 104 through a communications network, such as the Internet 102, and either a first Internet Service Provider 102-1 or a second Internet Service Provider 102-2 to the transaction server 100. The first ISP 102-1 communicates with routing device 402, and the second ISP 102-2 communicates with routing device 404. Routing devices 402 and 404 provide access to a security firewall line DMZI. Checkpoint firewalls 108-1, 108-2 provides security in connection with user access to Hydra Web-1 and Hydra Web-2 110-1, 110-2 and to web servers 103-1, 103-2. Another routing device 406 can link the web servers 103-1, 103-2 and the Hydra Web servers 110-1, 110-2 with the mainframe computer 118 and the databases 112-1, 112-2. Routing devices 408, 410 provide a communications over a network, in this case, a frame relay network, between the transaction server 100 and the auction server 126.

Auction Server Database Schema

Table Definitions:

Table: Users

The Users table defines static information about entities (users or programs) which are allowed access to parts of the system. Each bid in the system must be associated with a user. The degree of access to various components will be determined by the UserRoles table. Each user is assigned a unique UserID which is used to refer to the user from other tables.

| Columns Name | Type | Size |
| --- | --- | --- |
| UserID | Number(Long) | 4 |
| SecurityType | Number(Integer) | 2 |
| SecurityKey | Text | 255 |
| UserName | Text | 60 |
| CompanyName | Text | 50 |
| ContactName | Text | 80 |
| Department | Text | 50 |
| Address | Text | 255 |
| City | Text | 50 |
| StateOrProvince | Text | 20 |
| PostalCode | Text | 20 |
| Country | Text | 50 |
| PhoneNumber | Text | 30 |
| Extension | Text | 30 |
| FaxNumber | Text | 30 |
| EmailAddress | Text | 50 |
| Notes | Memo | — |

NOTE: The SecurityType and SecurityKey fields allow various security mechanisms to be employed. No passwords will be stored in the clear anywhere in the database. At the least a 'salt' can be stored in order to support UNIX-style passwd security.

Table: Roles

The Roles table provides a convenient repository for security roles defined by the auction system. Each role is assigned a unique RoleID which will be referred to by the UserRoles table.

| Columns Name | Type | Size |
| --- | --- | --- |
| RoleID | Number(Long) | 4 |
| RoleName | Text | 20 |

Table: UserRoles

The UserRoles table enumerates all of the roles that are associated with a particular user.

| Columns Name | Type | Size |
| --- | --- | --- |
| UserID | Number(Long) | 4 |
| RoleID | Number(Long) | 4 |

Table: Auctions

The Auctions table defines static information about auctions. It provides each auction with a unique AuctionID which is used to refer to the auction from other tables.

| Columns Name | Type | Size |
| --- | --- | --- |
| AuctionID | Number(Long) | 4 |
| UserID | Number(Long) | 4 |
| Symbol | Text | 10 |
| Description | Text | 80 |
| URL | Hyperlink | — |
| ModelID | Number(Long) | 4 |

-continued

| Columns Name | Type | Size |
| --- | --- | --- |
| Available | Number(Long) | 4 |
| MinPrice | Currency | 8 |
| MinCapital | Currency | 8 |
| PriceIncrement | Currency | 8 |
| OpenTime | Date/Time | 8 |
| CloseTime | Date/Time | 8 |
| Status | Number(Integer) | 2 |

NOTE: The ModelID is a reference to an entry in the Models table which specifies what type of auction model to run and what specific parameters will be in effect for the auction.

Table: ModelTypes

The ModelTypes table defines 'classes' of auction models and assigns them unique ModelTypeIDs. Specific models are described in the Models table which also supplies model specific operating parameters for the auction.

| Columns Name | Type | Size |
| --- | --- | --- |
| ModelTypeID | Number(Long) | 4 |
| ModelTypeName | Text | 50 |

Table: Models

The Models table provides 'instances' of the various types of models described in the ModelTypes table. Each model is assigned a unique ModelID which is how it will be referred to from the Auctions table.

| Columns Name | Type | Size |
| --- | --- | --- |
| ModelID | Number(Long) | 4 |
| ModelName | Text | 50 |
| ModelTypeID | Number(Long) | 4 |
| Parameters | Text | 80 |

NOTE: The Parameters field contains parameters specific to the model type selected by ModelTypeID. If this text field is not sufficient to represent all of the parametric information for more complex model types then additional model type specific tables may be introduced.

Table: Bids

The Bids table represents the state of each bid known to the system. When a bid is first entered into the system it is assigned a unique BidID and a new row is inserted into this table. All other activities involving this bid (including cancellation, corrections, fills, etc.) will result in an update of the information for this bid's row in the table.

| Columns Name | Type | Size |
| --- | --- | --- |
| BidID | Number(Long) | 4 |
| AuctionID | Number(Long) | 4 |
| UserID | Number(Long) | 4 |
| AccountID | Number(Long) | 4 |
| BidPrice | Currency | 8 |
| BidSize | Number(Long) | 4 |
| FillPrice | Currency | 8 |
| FillSize | Number(Long) | 4 |

-continued

| Columns Name | Type | Size |
| --- | --- | --- |
| Qualifiers | Text | 50 |
| Status | Number(Integer) | 2 |

NOTE: The AccountID field is provided as an aid for the user in matching their orders with records in the database.

Table: BidLog

The BidLog table represents the complete transaction history of each bid known to the system. Each transaction is assigned a unique BidTxID. All transactions refer to the original bid created in the Bid table using the unique BidID.

| Columns Name | Type | Size |
| --- | --- | --- |
| BidTxID | Number(Long) | 4 |
| BidID | Number(Long) | 4 |
| UserID | Number(Long) | 4 |
| Action | Number(Integer) | 2 |
| Price | Currency | 8 |
| Size | Number(Long) | 4 |
| Qualifiers | Text | 50 |

NOTE: It is essential that the Bids and BidLog tables be updated atomically within a single transaction.

SAMPLE QUERIES:

In order to illustrate that the table descriptions above are effective and sufficiently flexible, we provide some sample queries below. These sample queries are not intended to represent what production SQL code will ultimately look like. Only one module will interact directly with the RBS. No other parts of the system will be exposed to the schema specifics or will need to use SQL directly.

User Authentication:

When a user or program needs to sign on it will provide a username which can be used to look up the user record like:

select UserID, SecurityType, SecurityKey
from Users
where UserName '<some_user_name>'

The UserID will be retained by the program during the session in order to verify roles as necessary. The SecurityType and SecurityKey can be used to authenticate the user or to offer additional challenges according to the security policy.

Determining Access:

Access to resources will be governed by the roles assigned to the user making a request. Here is a query which determines all of the roles a particular user can fill select RoleID from UserRoles where UserID=<some_user id>

To check for a particular role one could use select count (*) from UserRoles where UserID=<some_user_id> and RoleID=<some-role-id>

Running an Auction:

When we want to run an auction we must first determine its operating parameters from the Auctions and Models tables.

select M.ModelTypeID, M.Parameters from Auctions A, Models M where A.ModelID=M.ModelID and A.AuctionID=<our_auction_id>

Next, in order to run the auction we'll need the complete state of all of the uncancelled bids in the auction.

select BidID, BidPrice, BidSize, Qualifiers from Bids
        where Status=<open_status>

Once the auction has run to completion we can update the fill status of each of its bids in the Bids table and log the transactions in the BidLog table.

begin transaction

Update the state of each bid in the auction

Log the final transaction (fill or not) for each bid update Bids set FillPrice=<a-fill-price>, FillSize <a_fill_size, Status—<a_new_status> where BidID=<first_bid_id> insert BidLog(BidTxID, BidID, Action, Price, Size, Qualifiers)

values(<new_tx_id>, <first_bid_id>, <an action>,

<a fill_price>, <a_fillsize>, <any_qualifiers>)

update Bids set FillPrice=<a_fill_price>,

FillSize=a_fill_size,

Status=a_new status> where BidID=second bid id> insert BidLog (BidTxID, BidID, Action, Price, Size, Qualifiers)

values(<new_tx_id>, <second_bid_id>, <an_action>,

<a_fill prTce>, <a-fill-size>, <any-quaiifiers>)

update Bids set FillPrice=a_fill_price>,

FillSize=a_fill_size,

Status=a_new_status> where BidTD=nth_bid_id> insert BidLog(BidTxID, BidID, Action, Price, Size, Qualifiers)

values(<new_tx_id>, <nth_bid _id>, <an_action>,

<a_fill_price>, <a_fill_size>, <any_qualifiers>)

commit transaction

Producing an Auction Report:

There are many possible reports that might be requested based on the data in the database. The following will produce, for a particular auction, a table displaying for each bid, how many shares were filled and the total cost to that bidder. In addition, summary rows are produced for each user which display the total number of shares and the total cost of those shares that were allocated to their accounts.

select UserName, AccountID, FillSize, FillPrice*FillSize
        from Users R, Bids B
    where AuctionID-<an_auction_id> and R.UserID=B.UserID and
    Status-<FILLED>
    order by R.UserName, AccountID
    compute SUM(FillSize), SUM(FillPrice*FillSize) by R.UserName The following query will display, for a particular auction, the complete history of transactions for each bid broken down by user and account.

```
    select UserName, AccountID, BidID, BidTxID, Action,
            Price, Size, Qualifiers
        from Users R, BidLog L, Bids B
    where B.AuctionID = <an_auction_id> and
            L.BidID = B.BidID and
            R.UserID = B.UserTD
    order by R.UserName, AccountID, BidID
/* $Id: DataTypes,v 1.3 1998/04/20 22:56:14 jordan Exp $*/
// base types
Cardinal        :   32 bit unsigned number
Integer         :   32 bit signed number
Real            :   IEEE double-precision floating point number
String          :   NUL-terminated character string// unicode?
TimeStamp       :   {
                        Cardinal    julianDay;
                        Cardinal    msPastMidnite;
                    }
// enumerations
Status          :   enumeration {
                        Status_OK,
                        Status_ERROR
AuctionStatus   :   enumeration
                        AuctionStatus_NOT_OPEN,
                        AuctionStatus_WITHDRAWN,
                        AuctionStatus_OPEN,
                        AuctionStatus_CLOSED,
                        AuctionStatus_RUNNING,
                        AuctionStatus_FILLED
MessageType     :   enumeration {
                        MessageType_SYSTEM_HELLO,
                        MessageType_SYSTEM_RESPONSE,
                        MessageType_SYSTEM_PING,
                        MessageType_SYSTEM_PONG,
                        // auction manipulation
                        MessageType_AUCTION_CREATE,
                        MessageType_AUCTION_MODIFY,
                        MessageType_AUCTION_DELETE,
                        MessageType_AUCTION_STATUS,
                        MessageType_AUCTION_GET
                        // user manipulation
                        MessageType_USER_CREATE,
                        MessageType_USER_MODIFY,
                        MessageType_USER_DELETE,
                        MessageType_USER_STATUS,
                        MessageType_USER_GET
                        // bid manipulation
                        MessageType_BID_CREATE,
                        MessageType_BID_MODIFY,
                        MessageType_BID_DELETE, really cancel
                        MessageType_BID_STATUS,
                        MessageType_BID_GET
                        // fill manipulation
                        MessageType_FILL_CREATE,
                        MessageType_FILL_STATUS,
                        MessageType_FILL_GET
// objects
User            : {
                    String      userId;
                    String      password;
                    String      contactInfo;
UserList        : {
                    Cardinal    numUsers;
                    String< >   userIds;
UserACL
                    String aclId;
                    // each can be User or UserACL
                    String< > members;
Auction         : {
                    String      auctionId;      // NULL for create
                    String      description;
                    String      url;
                    Cardinal    sharesAvailable;
                    Real        minPrice;
                    Real        minCapitalization;
                    Real        priceIncrement;
                    TimeStamp   openTime;
                    TimeStamp,  closeTime;
                    AuctionStatus status;
```

```
                                    -continued
AuctionList        : {
                          Cardinal     numAuctions;
                          String< >    auctionIds;
Bid                : {
                          String       bidId;          // NULL for create
                          User         userId;
                          String       accountId;
                          String       brokerTxId;
                          String       auctionId;
                          Integer      size;
                          Real         price;
BidList            : {
                          Cardinal     numBids;
                          String< >    bidIds;
Fill               : {
                          String       fillTxId;       // NULL for create
                          String       bidTd;          // original bid
                          Real         price;
                          Integer      size;
FillList           : {
                          Cardinal     numFills;
                          String< >    fillTxIds;
// message types
// system messages
// response is SystemResponse
SystemHello        : {
                          String       message;
                          }
// is-a response
SystemResponse     : {
                   status    status;
                   String    text; // typically failure reason,
                                   for Status_ERROR, but can
                                   be overloaded for Status_OK
// response is SystemPong
SystemPing         : {
                          TimeStamp    timeStamp;
                          String       text;
// is-a reponse
SystemPong         : {
                          TimeStamp    timeStamp;
                          String       text;
// auction messages
response is SystemResponse if (Status_OK) text is new auctionId;
AuctionCreate      : {
                          Auction      auction;
// response is SystemResponse
AuctionModify      : {
                          Auction      auction;
// resposne is Auction
AuctionStatus      : {
                          String       auctionId;
// response is AuctionList
AuctionGet         : {
                          Auction      auction;        // allows wildcards
// response is SystemResponse
AuctionDelete: {
                          String       auctionId;
// user messages
// response is SystemResponse if (Status_OK) text is new userId;
UserCreate: {
                          User         user;
// response is SystemResponse
UserModify         : {
                          User         user;
// response is User
UserStatus: {
                          String       userId;
// response is UserList
UserGet    : {
                          User         user;           // allows wildcards
// response is SystemResponse
UserDelete: {
                          String       userId;
// bid messages
// response is SystemResponse if (Status_OK) text is new bidId;
BidCreate : {
                          Bid          bid;
```

```
                                    -continued
// response is SystemResponse
BidModify: {
                          Bid          bid;
response is Bid
BidStatus : {
                          String       bidId;
response is BidList
BidGet    : {
                          Bid          bid;            // allows wildcards
// response is SystemResponse
BidDelete : {
                          String       bidId;
// fill messages
response is SystemResponse
if (Status_OK) text is new fillId;
FillCreate        :       {
                          Fill         fill;
                          }
// response is Fill
FillStatus        :       {
                          String       fillId;
response is FillList
FillGet
                          Fill         fill;           // allows wildcards
meta-message format
MessageId: {
                          Cardinal     serial;         // hi-bits
                          Cardinal     sequence;       // lo-bits
Message : {
                          String       baton;          // for client use
                          MessageId    msgId;          // server-generated
                          MessageId    irtId;          // in response to
                          TimeStamp    sent;           // sender
                          TimeStamp    rcvd;           // recipient
                          MessageType  msgType;
                          union {
                             SystemHello;
                             SystemResponse;
                             SystemPing;
                             SystemPong;
```

Auction Processes Using the Auction Server Database schema

Figure 9:
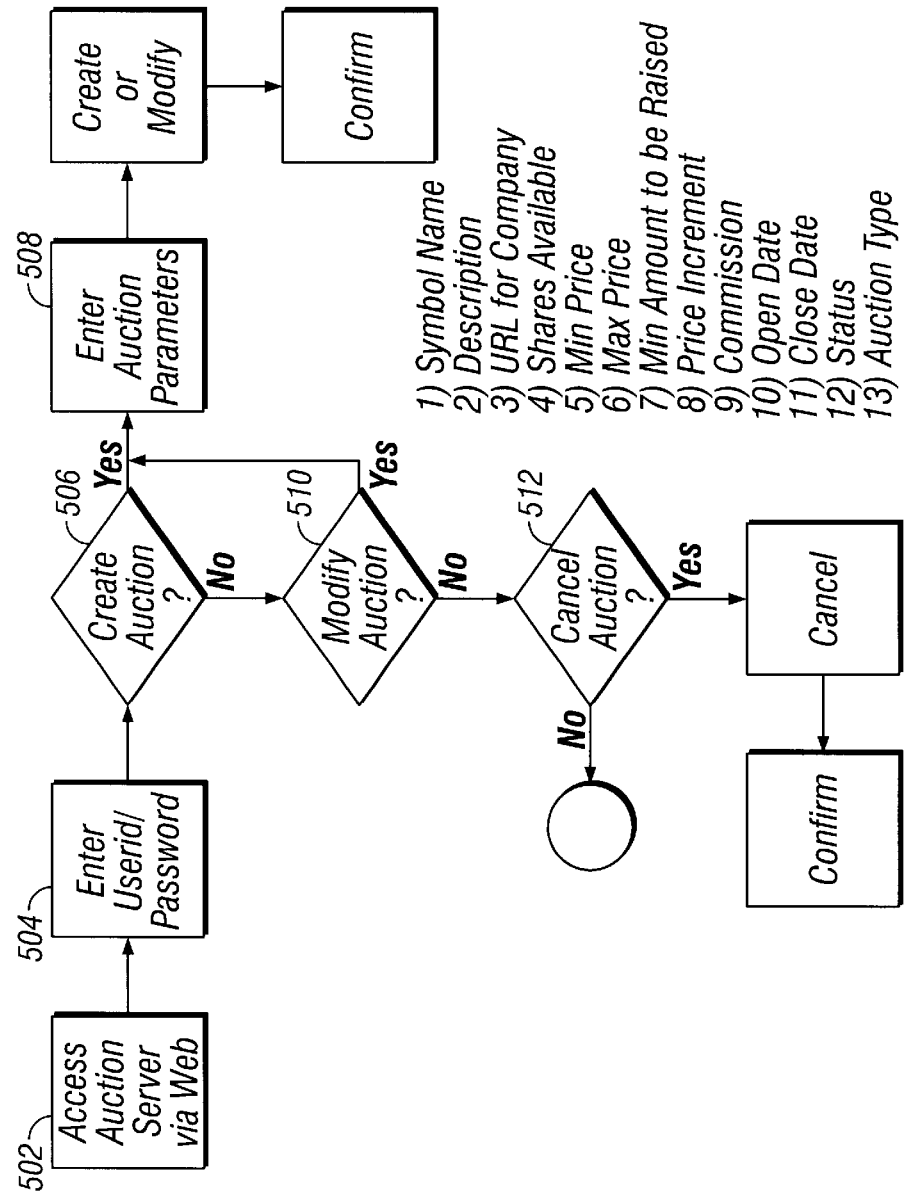
FIG. 9 is an illustrative flow diagram of the process of creating, modifying or cancelling an auction transaction using the auction server database schema.

Referring to the illustrative drawing of FIG. 9, there is shown a flow diagram for the process of creating, modifying or cancelling an auction using the Auction Server schema. A user accesses the system via the internet (502). When a user enters UserID/Password (504): system uses the Users Table and Roles Table to identify users and determine what level of access they have. The UserID is retained by the program during the user session to verify roles as necessary. The SecurityType and SecurityKey can be used to authenticate the user or to offer additional challenges according to the security policy.

Create Auction (506): system creates new entry into Auction Table with unique AuctionID and a UserId to identify creator of auction.

Enter Auction Parameters (508): system enters parameters into Auction Table for previously created auction.

Modify Auction (510): system modifies auction parameters stored in Auctions Table.

Cancel Auction (512): system changes state of Auction controlled by status field in Auctions Table.

Figure 10:
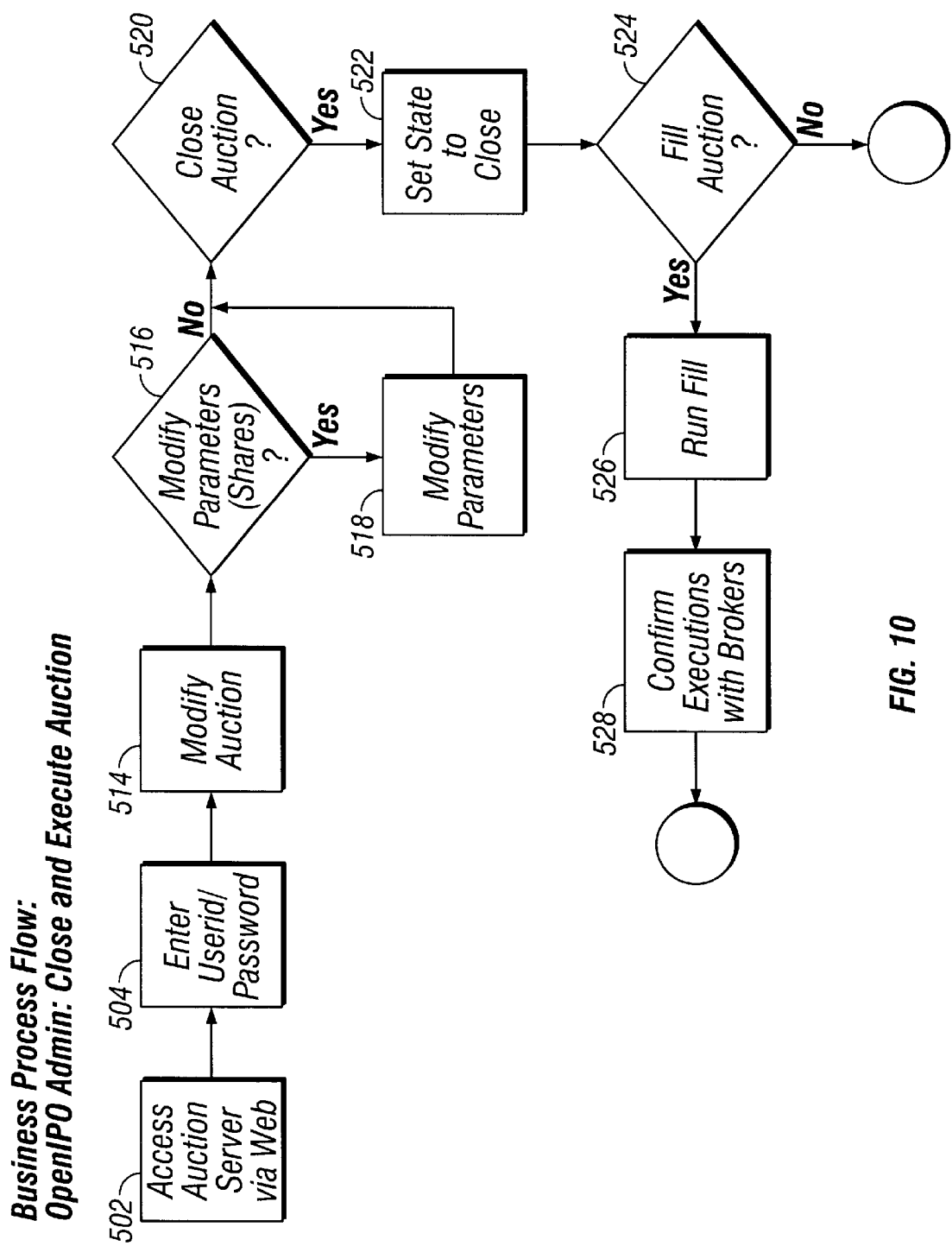
FIG. 10 is an illustrative flow diagram of the process of closing and executing an auction transaction using the Auction Server database schema.

Referring to the illustrative drawing of FIG. 10, there is shown a flow diagram for the process of closing and executing an auction using the auction server schema.

When ready to close auction, a Modify (514, 516, 518) of the Auction Table is executed to update any of the auction parameters as well as to change the Status of the auction.

Figure 11:
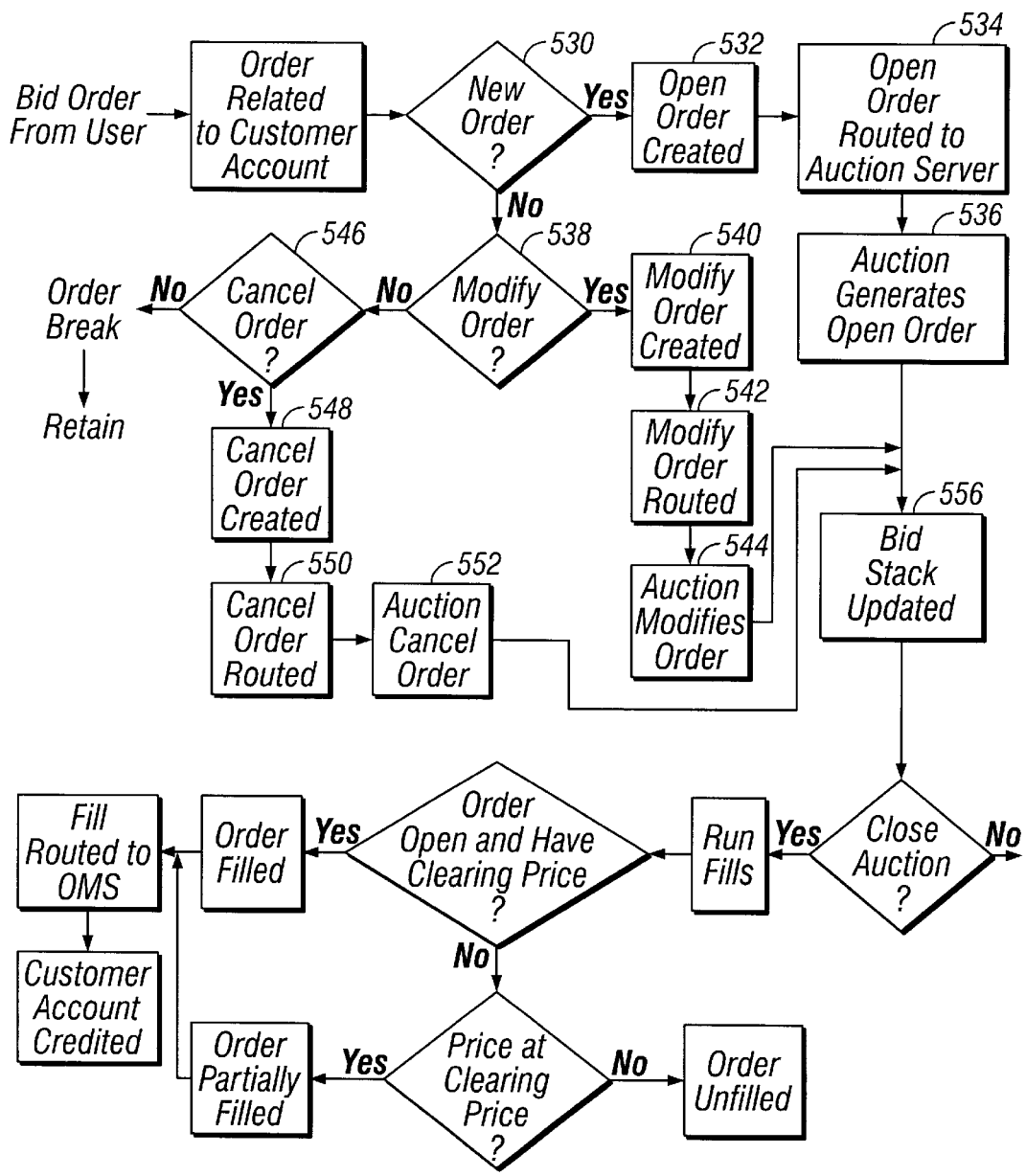
FIG. 11 is an illustrative flow diagram of the process of creating, modifying and cancelling bids in a bid table using the auction server database schema.

Filling or running the auction (520–528) involves determining the operating parameters from the Auction and Models tables. Next, the fill step involves determining the complete state of all uncancelled bids in the auction from the Bids Table. Once the auction has run to completion, the fill status of each bid is updated in the Bids Table and the transactions are logged in the BidLog table. Referring to the illustrative drawing of FIG. 11, there is shown a flow diagram of a process of creating, modifying oro closing bids using the Auction Server schema.

Once an order has been routed to the auction server from the order management system of a participating broker, then the auction server database schema come into play.

A New Order (530–536, 556) creates a new entry into the Bids Table, which is keyed by the BidID and AuctionID. Parameters specified in the New Order message are inserted into the parameter fields for this entry. In addition, the New Order is logged as an entry into the BidLog table, where it is keyed by a unique BidTxID and tied to a particular entry in the Bid Table through the BidID. A Modify or a Cancel Order (538–552, 556) results in an update to an existing entry in the Bid Table. The auction system associates such change orders with a particular entry. In the Bid Table based on identifying parameters in the order message. These changes are also entered as transactions into the BidLog Table, where the Action parameter specifies the particular action taken on a bid.

Figure 12A:
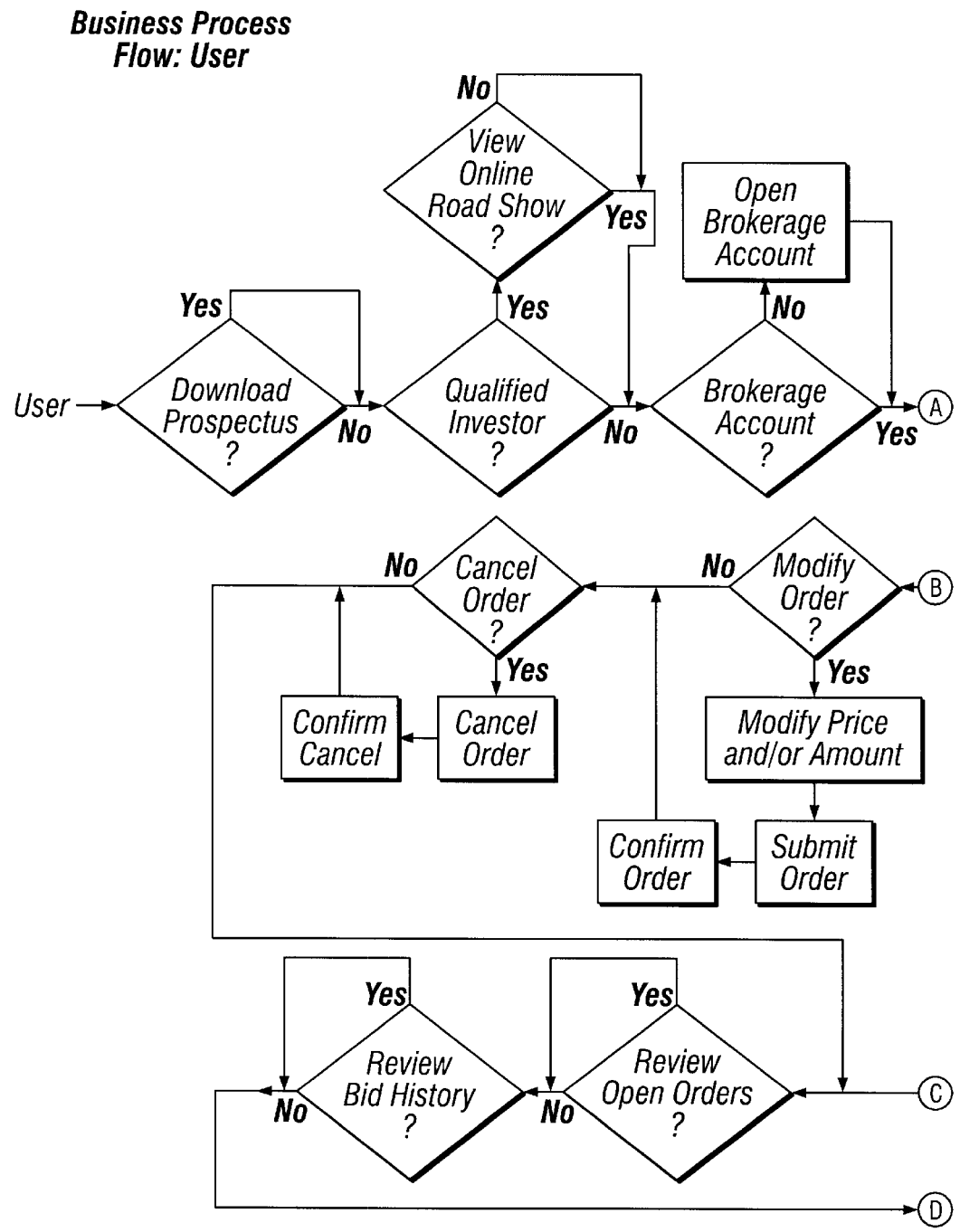
FIGS. 12A and 12B are illustrative flow diagrams of possible User interaction with a transaction server and auction server of a present embodiment.
Figure 12B:
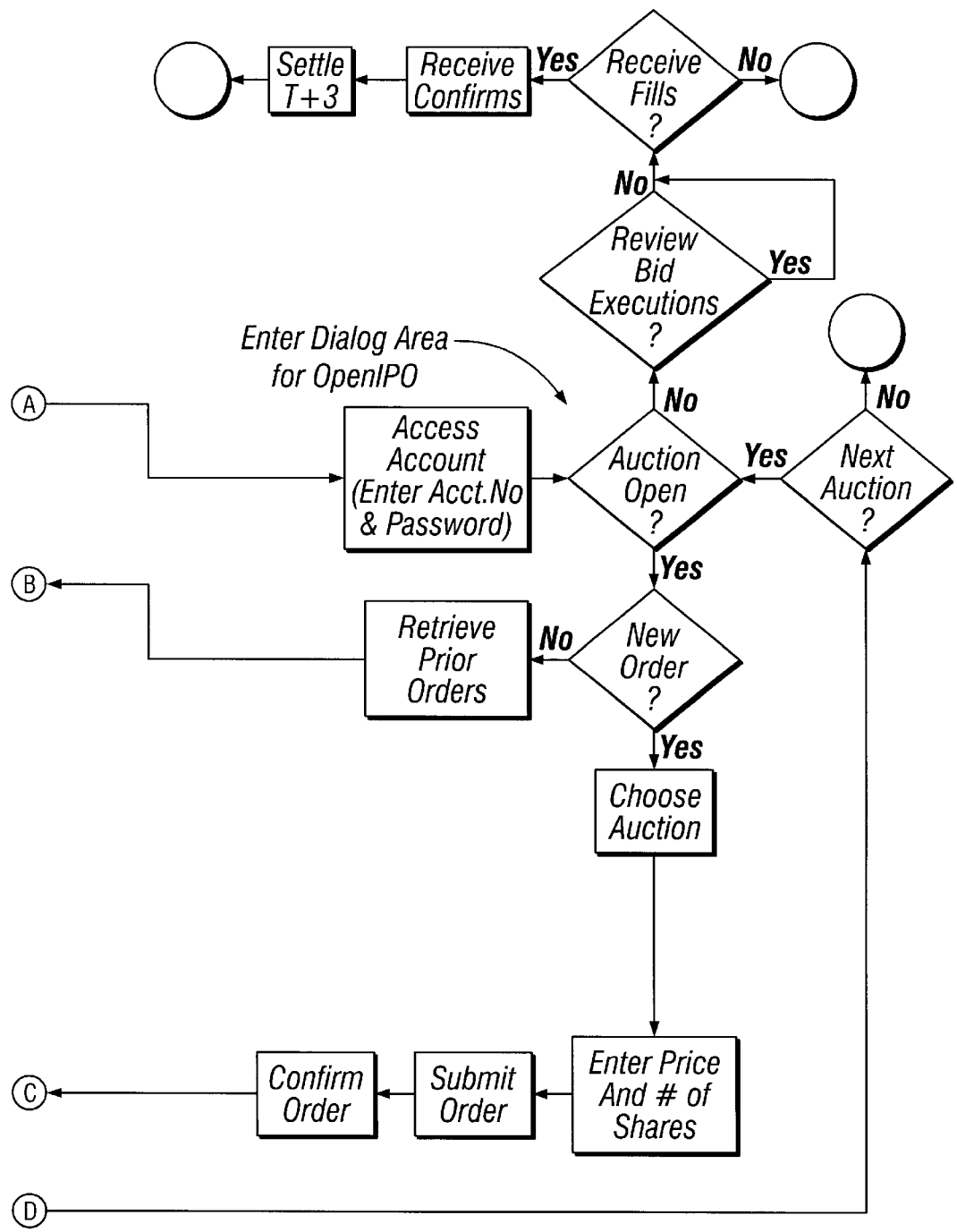

Referring to FIGS. 12A and 12B, there is shown an example of a user interaction with a transaction server and an auction server.

Figure 13:
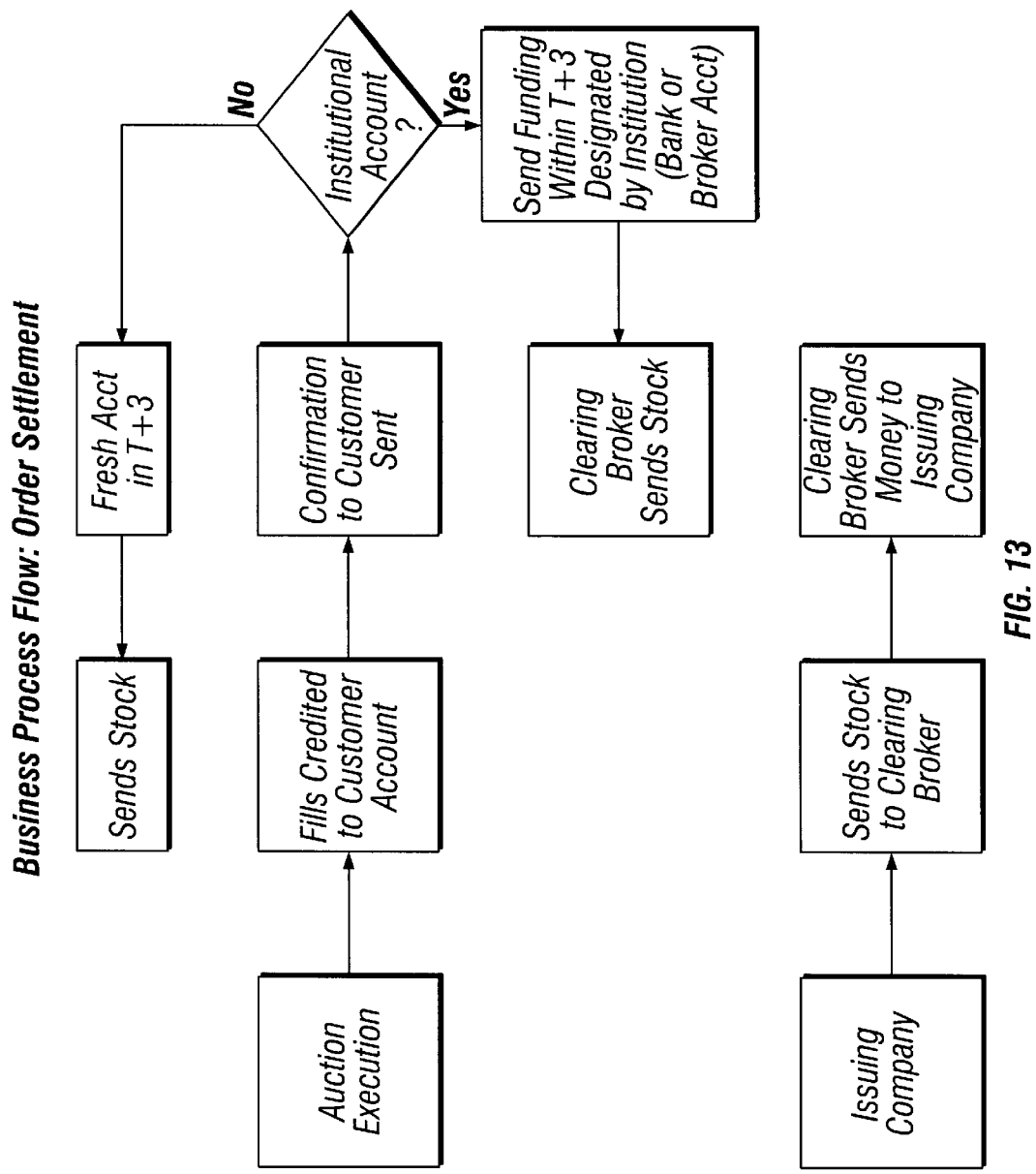
FIG. 13 is an illustrative flow diagram of an order settlement process in accordance with a present embodiment of the invention.

FIG. 13 illustrates an example of an order settlement process.

Figure 14:
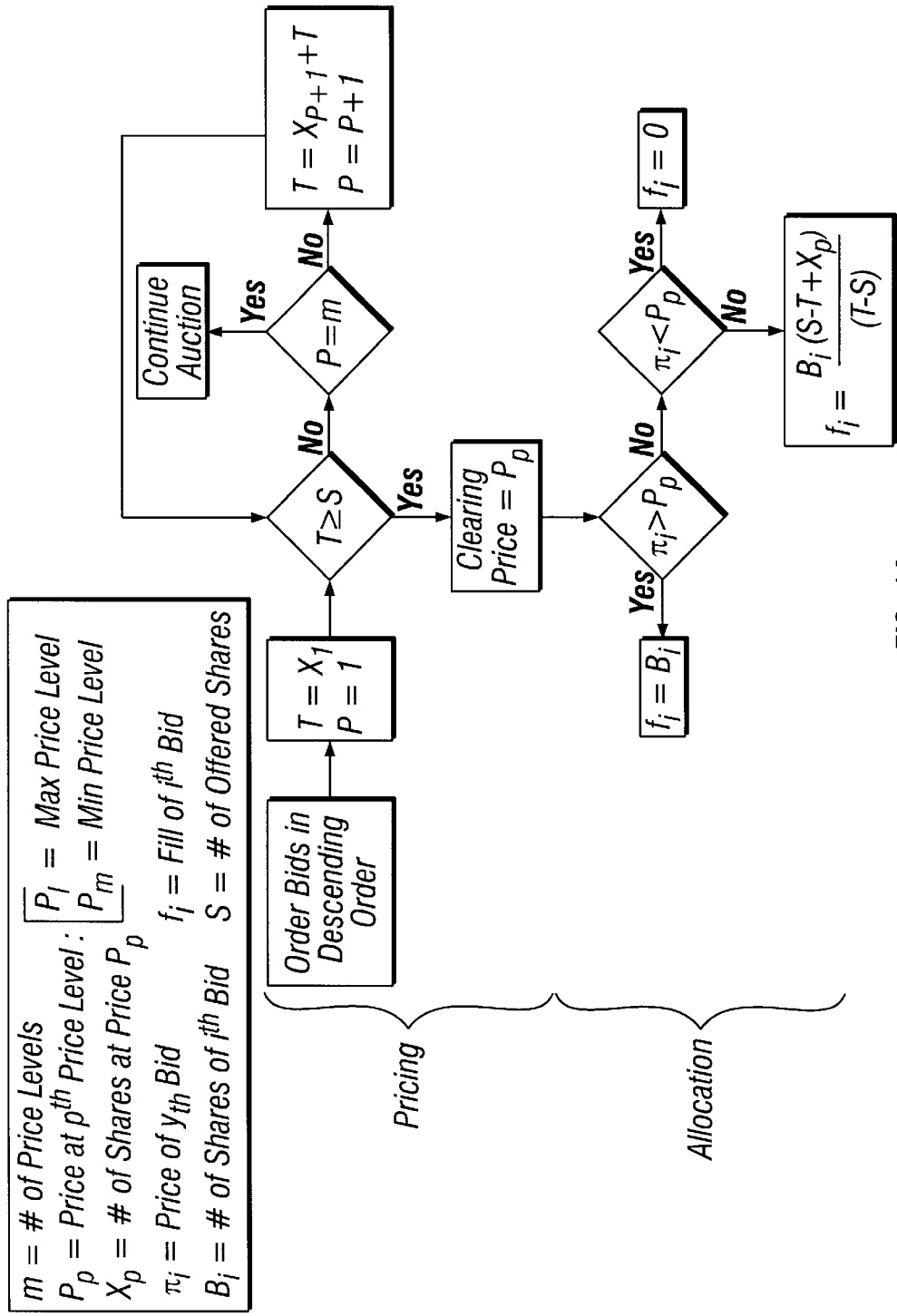
FIG. 14 is an illustrative flow diagram of a pricing and allocation algorithm in accordance with a presently preferred embodiment of the invention.

FIG. 14 shows a business flow process for pricing and allocating shares.

Addendum A

EXAMPLE PLAN OF DISTRIBUTION

Subject to the terms and conditions of an underwriting agreement, Underwriter No. 1 and Underwriter No. 2., as underwriters, will purchase from Issuer the following respective number of shares of common stock at the public offering price less the underwriting discounts and commissions set forth on the cover page of this prospectus.

| Underwriter | Number of Shares |
|---|---|
| Underwriter No. 1 | |
| Underwriter No. 2 | |
| TOTAL | 2,500,000 |

The underwriting agreement provides that the obligations of the underwriters are subject to conditions, including the absence of any material adverse change in Issuer's business, and the receipt of certificates, opinions and letters from Issuer and its counsel and independent accountants. Subject to those conditions, the underwriters are committed to purchase all shares of common stock offered if any of the shares are purchased.

The underwriters propose to offer the shares of common stock directly to the public at the offering price set forth on the cover page of this prospectus, as this price is determined by the process described below, and to certain dealers at this price less a concession not in excess of $_____ per share. Any dealers or agents that participate in the distribution of the common stock may be deemed to be underwriters within the meaning of the Securities Act, and any discounts, commission or concessions received by them and any provided by the sale of the shares by them might be deemed to be underwriting discounts and commissions under the Securities Act. After the completion of the initial public offering of the shares, the public offering price and other selling terms may be changed by the underwriters.

The public offering price set forth on the cover page of this prospectus will be based on the results of an auction process, rather than solely through negotiations between Issuer and the underwriters. The plan of distribution of the offered shares differs somewhat from traditional underwritten public offerings of equity securities.

The auction process will proceed as follows:

Prior to effectiveness of the registration statement relating to this offering, the underwriters and participating dealers will solicit indications of interest from prospective investors through the Internet as well as by traditional means. The indications of interest will specify the number of shares the potential investor proposes to purchase and the price the investor is willing to pay for the shares. After effectiveness, the underwriters will confirm whether pre-effective indications of interest are firm bids. All indications of interest that are not confirmed prior to the close of the auction will be deemed withdrawn. The public offering price will ultimately be determined by negotiation between the underwriters and Issuer. The principal factor in establishing the public offering price will be the price per share, or clearing price, that equals the highest price set forth in valid at which all of the shares may be sold to potential investors. The public offering price may be lower than the clearing price based on negotiations between the underwriters and Issuer.

A simplified example of the auction process is as follows: Company X offers to sell 100 shares in its public offering through this auction process. Underwriter No. 1, on behalf of the Company X, receives five indications of interest, all of which are kept confidential until the auction process ends. The first indication of interest is to pay $10 per share for 10 shares, the second is for $9 per share for 30 shares, the third for $8 per share for 60 shares, the fourth for $8 per share for 40 shares and the last for $7 a share for 80 shares. After the registration statement becomes effective, all potential investors who have submitted indications of interest will be advised of that fact and asked to confirm that their indications of interest are now offers to purchase shares. No additional offers to purchase would be received. The clearing price used to determine the public offering price would be $8 because $8 equals the highest price at which all 100 shares may be sold, to the potential investors who have submitted valid bids. The two potential investors with the highest offers to purchase would receive all the shares they requested, totaling 40 shares. The next two potential investors would receive the remaining 60 shares in proportion to the amounts they asked for or 36 and 24 shares each. The potential investor with the lowest offer to purchase would receive no shares in this example.

Valid indications of interest and offers to purchase are those that meet the requirements, including eligibility, account status and size, established by the underwriters or participating dealers. In determining the validity of offers to purchase, in addition to minimum account balances, a prospective investor submitting an indication of interest or offer to purchase through Underwriter No. 1, brokerage account may be required to have an account balance equal to or in excess of the aggregate dollar amount of the prospective investor's offer to purchase. Although funds may be required to be in an account as a condition to the offer to purchase being considered valid, the funds will not be transferred to the underwriters until the closing of the offering. Conditions for valid indications of interest and offers to purchase, including eligibility standards and account funding requirements, of other underwriters or participating dealers may vary. The offered shares will be purchased from Issuer by the underwriters and sold through the underwriters and participating dealers to investors who have submitted offers to purchase at or in excess of the clearing price. The number of shares sold to an investor submitting an offer to purchase precisely at the clearing price may be subject to a pro rata reduction. Each participating dealer has agreed with the underwriters to sell shares they purchase from the underwriters in this manner, unless otherwise consented to by the underwriters. Shares issued upon exercise of the underwriters' over-allotment option will be allocated in the same manner. The underwriters reserve the right to reject bids that they deem manipulative, disruptive or which they deem necessary or beneficial to facilitate the orderly completion of the offering, and reserve the right, in exceptional circumstances, to alter this method of allocation as they deem necessary to effect a fair and orderly distribution of the shares. For example, large orders may be reduced to insure a public distribution and indications of interest or offers to purchase may be rejected by the underwriters or participating dealers based on eligibility or creditworthiness criteria Price and volume volatility in the market for Issuer's common stock may result from the somewhat unique nature of the proposed plan of distribution. Price and volume volatility in the market for Issuers' common stock after the completion of this offering may adversely affect the market price of Issuer's common stock. Issuer has granted to the underwriters an option, exercisable no later than 30 days after the date of this prospectus, to purchase up to an aggregate of 375,000 additional shares of common stock at the offering price, less the underwriting discount, set forth on the cover page of this prospectus. To the extent that the underwriters exercise this option, the underwrites will have a firm commitment to purchase the additional shares, and Issuer will be obligated to sell the additional shares to the underwriters. The underwriters may exercise the option only to cover over-allotments made in connection with the sale of shares offered. The underwriting agreement provides that Issuer will indemnify the underwriters against specified liabilities, including liabilities under the Securities Act, or contribute to payments that the underwriters may be required to make. Issuer has agreed not to offer, sell contract to sell, or otherwise dispose of any shares of common stock, or any options or warrants to purchase common stock other than the shares of common stock or options to acquire common stock issued under Issuers' 1995 stock option plan, employee stock purchase plan or upon the conversion of outstanding warrants, for a period of 90 days after the date of this prospectus, except with the prior written consent of Underwriter No. 1.

Prior to the offering, there has been no public market for Issuers' common stock. The initial public offering price for the common stock will be determined by the process described above and does not.

We claim:

1. A computer implemented method for determining price and allocation of equity shares in an offering comprising:

providing information about an offering to accept bids for equity shares to at least one qualified potential purchaser and at least one non-qualified potential purchaser;

offering to accept bids only from one or more qualified potential purchasers via a communication network for equity shares, wherein at least one non-qualified potential purchaser submits a bid through a qualified potential purchaser;

receiving bids via a communication network only from qualified potential purchasers of the offered shares;

determining a clearing price for the offered shares based upon the received bids;

allocating to prospective investors who bid a price above the clearing price all of the shares for which they bid;

allocating to prospective investors who bid a price equal to the clearing price a pro-rata allocation of the shares for which they bid; and allocating zero shares to prospective investors who bid a price below the clearing price.

2. The computer implemented method of claim 1, wherein said step of determining a clearing price for the offered shares based upon the received bids is based on a prescribed amount of capital that is to be raised.

3. The computer implemented method of claim 1, wherein said step of determining a clearing price for the offered shares based upon the received bids is based on a prescribed number of shares being offered.

4. The computer implemented method of claim 1, wherein said step of offering to accept bids for equity shares further comprises setting an initial price range in which bids must be within or setting a minimum price bids must be above.

5. The computer implemented method of claim 3, wherein said step of determining a clearing price for the offered shares based upon the received bids comprises:

arranging the received bids in descending order based on price;

summing the aggregate quantity of shares bid for starting with the bid with the highest price and descending downward in price; and determining at which price the aggregate quantity of shares bid for is equal to or greater than the prescribed number of shares being offered.

6. The computer implemented method of claim 1, wherein said pro-rata allocation for a prospective investor who bid a price equal to the clearing price is calculated by:

determining the total number of shares bid for above said clearing price;

subtracting from a total number of shares being offered said total number of shares bid for above said clearing price;

determining the product of the quantity of shares bid for by said prospective investor and the value determined by subtracting from a total number of shares being offered said total number of shares bid for above said clearing price; and dividing said product by a sum of the number of shares bid for at said clearing price.

7. The computer implemented method of claim 1, wherein said steps of offering to accept bids for equity shares and receiving bids from potential purchasers of the offered shares are performed through a World Wide Web based interface.

8. The computer implemented method of claim 1, wherein said potential purchasers are registered with a designated underwriter.

9. The computer implemented method of claim 1, wherein said potential purchasers are either institutional investors or retail investors.

10. The computer implemented method of claim 9, wherein said retail investors participate as bidders via an on-line brokerage firm.

11. The computer implemented method of claim 1, wherein said bid comprises the number of shares the potential purchaser would be willing to purchase and the price per share such potential purchaser would be willing to pay.

12. The computer implemented method of claim 1, wherein said clearing price is equal to the offering price of said equity securities.

13. The computer implemented method of claim 1, wherein said bids are binding contracts.

14. The computer implemented method of claim 1, wherein said bids are indications of interest.

15. The computer implemented method of claim 1, further comprising the step of preparing auction reports summarizing information relating to bids and share allocation results.

16. The computer implemented method of claim 1, wherein said step of receiving bids from potential purchasers of the offered shares comprises receiving bids from broker dealers.

17. The computer implemented method of claim 16, wherein said bids received from broker dealers were submitted to a broker dealer open order system by users and treated as good until cancelled limit orders.

18. A system for determining the price and allocation of equity securities of a company over the World Wide Web comprising:
   a user input terminal where qualified potential purchasers submit bids for equity shares; and
   a computer system connected to said user input terminal via a communications network;
   wherein the computer system is configured to:
   provide information about an offering to accept bids for equity shares to at least one qualified potential purchaser and at least one non-qualified potential purchaser;
   accept bids only from one or more qualified potential purchasers via the communications network, wherein at least one non-qualified potential purchaser submits a bid through a qualified potential purchaser;
   receive said bids only from qualified potential purchasers,
   determine a clearing price based upon the received bids;
   allocate to prospective investors who bid a price above the clearing price all of the shares for which they bid;
   allocate to prospective investors who bid a price equal to the clearing price a pro-rata allocation of the shares for which they bid; and
   allocate zero shares to prospective investors who bid a price below the clearing price.

19. The system of claim 18, wherein said computer system comprises:
   an auction server for processing said bids to determine said clearing price and the number of allocated equity shares to each prospective investor;
   an auction database for storing deal information concerning an auction transaction; and
   an account information computer for storing and managing prospective inventor account information.

20. The system of claim 19, wherein the computer system is configured to limit the total number of shares that may be sold to any one prospective investor.

21. The system of claim 19, wherein prior to said auction server processing said bids, said bids are associated with prospective investor account information from said account information computer and information concerning an auction from said auction database.

22. The system of claim 19, wherein said deal information comprises the symbol to be used to designate the company.

23. The system of claim 19, wherein said deal information comprises the price range for the deal.

24. The system of claim 19, wherein said deal information comprises the number of shares expected to be sold.

25. The system of claim 19, wherein said deal information comprises the expected opening and closing dates of the deal.

26. The system of claim 19, wherein said deal information comprises a limitation on the number of shares that a prospective investor may purchase.

27. The system of claim 19, wherein said deal information is also stored on said account information computer and auction server.

28. The system of claim 18, further comprising a research information server which provides information concerning an offering.

29. The system of claim 28, wherein said information comprises the full text of a prospectus that describes the proposed offering.

30. The system of claim 18, wherein limits are placed on bids submitted by certain prospective investors.

31. A computer implemented system for determining the price and allocation of equity securities of a company comprising:
   an order management server component for:
      providing information about an offering to accept bids for equity shares to at least one qualified potential purchaser and at least one non-qualified potential purchaser;
      offering to accept bids only from one or more qualified potential purchasers via a communication network, wherein at least one non-qualified potential purchaser submits a bid through a qualified potential purchaser; and
      receiving via a communication network bids only from qualified potential purchasers of offered equity securities;
   an auctioneer component for determining a clearing price for offered shares based on the received bids, allocating to prospective investors who bid a price above the clearing price all of the shares for which they bid, allocating to prospective investors who bid a price equal to the clearing price a pro-rata allocation of the shares for which they bid, and allocating zero shares to prospective investors who bid a price below the clearing price; and
   a data storage component for storing information associated with bids.

32. The system of claim 31, wherein said bids are received from said broker dealers.

33. The system of claim 31, wherein the bids received from broker dealers are submitted via a broker client module that interfaces with an order management system at the broker dealer.

34. The system of claim 31, wherein said data storage component stores information on users and user security information relating to user access rights to the system.

35. The computer implemented method of claim 1 wherein one of the one or more qualified potential purchasers comprises a financial institution, an on-line brokerage firm, an investment advisor, a certified financial planner, a certified financial advisor, or an insurance company.

36. The computer implemented method of claim 1, wherein:
- at least one of the one or more qualified potential purchasers comprises a qualified institutional investor, and
- at least one other of the one or more qualified potential purchasers comprises a qualified non-institutional investor, further comprising:
  - permitting the extension of credit for a bid only to qualified institutional investors; and
  - requiring qualified non-institutional investors to have funds in an account sufficient to cover a bid.

37. The computer implemented method of claim 1 wherein information about the offering comprises one or more of a prospectus, a description of the offering, auction guidelines and rules, instructions on how to open a brokerage account, marketing materials associated with the offering, a registration form, or a disclaimer.

38. The computer implemented method of claim 1 wherein at least one non-qualified potential purchaser submits a bid through a qualified potential purchaser that is an on-line brokerage firm.

39. The computer system of claim 18 wherein one of the one or more qualified potential purchaser comprises a financial institution, an on-line brokerage firm, an investment advisor, a certified financial planner, a certified financial advisor, or an insurance company.

40. The computer system of claim 18 wherein:
- at least one of the one or more qualified potential purchasers comprises a qualified institutional investor, and
- at least one other of the one or more qualified potential purchasers comprises a qualified non-institutional investor,
- the computer system further configured to:
  - permit the extension of credit for a bid only to qualified institutional investors; and
  - require qualified non-institutional investors to have funds in an account sufficient to cover a bid.

41. The computer system of claim 18 wherein information about the offering comprises one or more of a prospectus, a description of the offering, auction guidelines and rules, instructions on how to open a brokerage account, marketing materials associated with the offering, a registration form, or a disclaimer.

42. The computer system of claim 18 wherein at least one non-qualified potential purchaser submits a bid thorough a qualified potential purchaser that is an on-line brokerage firm.

43. The computer system of claim 31 wherein:
- at least one of the one or more qualified potential purchasers comprises a qualified institutional investor, and
- at least one other of the one or more qualified potential purchasers comprises a qualified non-institutional investor,
- the order management server component further configured to:
  - permit the extension of credit for a bid only to qualified institutional investors; and
  - require qualified non-institutional investors to have funds in an account sufficient to cover a bid.

44. The computer system of claim 31 wherein at least one non-qualified potential purchaser submits a bid thorough a qualified potential purchaser that is an on-line brokerage firm.

* * * * *